US012562068B2

(12) United States Patent
Keberle et al.

(10) Patent No.: US 12,562,068 B2
(45) Date of Patent: Feb. 24, 2026

(54) SYSTEM AND METHOD FOR SIMPLIFIED FLIGHT DIRECTION AND WAY-FINDING ON A PRIMARY FLIGHT DISPLAY

(71) Applicant: HONEYWELL INTERNATIONAL INC., Charlotte, NC (US)

(72) Inventors: Kelsey Keberle, Phoenix, AZ (US); Roberto Gudino, Phoenix, AZ (US); Jacob Kirk Maxfield, Phoenix, AZ (US); Dean Wilkens, Phoenix, AZ (US); Steven Crouch, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 115 days.

(21) Appl. No.: 18/394,733

(22) Filed: Dec. 22, 2023

(65) Prior Publication Data

US 2025/0209923 A1    Jun. 26, 2025

(51) Int. Cl.
*G08G 5/32* (2025.01)
*B64D 43/00* (2006.01)
(Continued)

(52) U.S. Cl.
CPC .............. *G08G 5/32* (2025.01); *B64D 43/00* (2013.01); *G06T 7/11* (2017.01); *G06T 7/73* (2017.01);
(Continued)

(58) Field of Classification Search
CPC .. G08G 5/32; G08G 5/50; G08G 5/55; G08G 5/26; B64D 43/00; G06T 7/11;
(Continued)

(56) References Cited

U.S. PATENT DOCUMENTS 7,925,394 B2    4/2011  Deker et al.
8,184,020 B2 *  5/2012  He ....................... G01C 23/005
                                                            701/16
(Continued)

FOREIGN PATENT DOCUMENTS

EP          2282173 A1    2/2011
WO    WO-2009119944 A1 * 10/2009   ......... G01C 21/3638

OTHER PUBLICATIONS

Theunissen, Eric & Rademaker, Richard & Etherington, Tim. (2002). Path Intercept Functionality for Perspective Flight Path Displays. 10.2514/6.2002-4788.

*Primary Examiner* — Tarek Elarabi
(74) *Attorney, Agent, or Firm* — Ingrassia Fisher & Lorenz LLP

(57) ABSTRACT

A method of providing navigational assistance includes: obtaining position information of an aerial vehicle relative to a defined path; calculating an intercept angle for the aerial vehicle to direct the aerial vehicle to a preferred track angle; generating a 3-D perspective projection synthetic view window depicts differences in three dimensions between a point on a defined path and the aerial vehicle at a latitude, longitude, altitude, and a given viewing angle. The 3-D perspective projection synthetic view window includes: a graphical depiction of the defined path through a subsequent waypoint, and a 3-D tactical navigational symbol that includes a preferred intercept angle symbol that is positioned relative to the graphical depiction of the defined path based on the preferred track angle and the intercept angle. The method further includes displaying the 3-D perspective projection synthetic view window on a display device for use in navigating the aerial vehicle.

20 Claims, 14 Drawing Sheets

300

(51) Int. Cl.

| | |
|---|---|
| *G06T 7/11* | (2017.01) |
| *G06T 7/73* | (2017.01) |
| *G06T 15/20* | (2011.01) |
| *G08G 5/26* | (2025.01) |
| *G08G 5/50* | (2025.01) |
| *G08G 5/55* | (2025.01) |

(52) U.S. Cl.
CPC ............... *G06T 15/20* (2013.01); *G08G 5/50* (2025.01); *G08G 5/55* (2025.01); *G06T 2207/30241* (2013.01); *G06T 2207/30252* (2013.01); *G08G 5/26* (2025.01)

(58) Field of Classification Search
CPC . G06T 7/73; G06T 15/20; G06T 2207/30241; G06T 2207/30252; G01C 23/005
See application file for complete search history.

(56) References Cited

U.S. PATENT DOCUMENTS

| | | | | |
|---|---|---|---|---|
| 9,389,097 | B2 | 7/2016 | He et al. | |
| 10,852,157 | B2 | 12/2020 | Shafaat et al. | |
| 11,262,211 | B2 * | 3/2022 | Youssef | G01C 23/005 |
| 2003/0023354 | A1 * | 1/2003 | Brust | G01C 23/005 |
| | | | | 701/18 |
| 2007/0145184 | A1 * | 6/2007 | Baudry | G01C 23/005 |
| | | | | 244/76 R |
| 2010/0030405 | A1 * | 2/2010 | He | G01C 23/00 |
| | | | | 701/14 |
| 2011/0025530 | A1 * | 2/2011 | He | G08G 5/21 |
| | | | | 340/972 |

* cited by examiner

200

204 ─
3-D PATH DEVIATION
INDICATOR CONTROLLER

208 ─
PROCESSOR

220 ─    218 ─ 222
I/O    DB

210 ─
MEMORY

212 ─
INSTRUCTIONS

214 ─
PROGRAM PRODUCT

216 ─
3-D PATH
DEVIATION
ALGORITHM AND
VARIABLES

─ 224

202 ─
PRIMARY FLIGHT DISPLAY

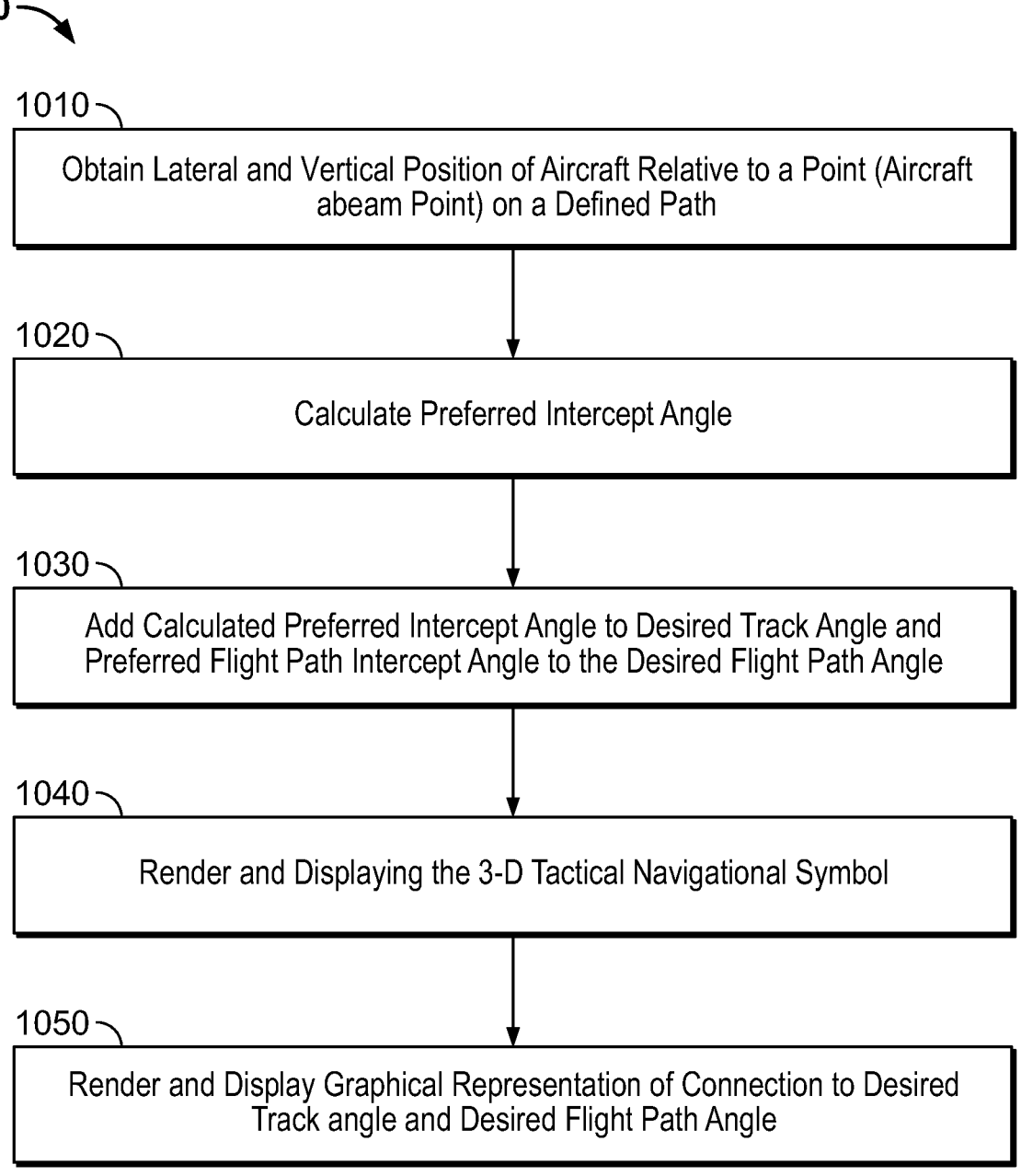

1000

1010

Obtain Lateral and Vertical Position of Aircraft Relative to a Point (Aircraft abeam Point) on a Defined Path

1020

Calculate Preferred Intercept Angle

1030

Add Calculated Preferred Intercept Angle to Desired Track Angle and Preferred Flight Path Intercept Angle to the Desired Flight Path Angle

1040

Render and Displaying the 3-D Tactical Navigational Symbol

1050

Render and Display Graphical Representation of Connection to Desired Track angle and Desired Flight Path Angle

FIG. 10

SYSTEM AND METHOD FOR SIMPLIFIED FLIGHT DIRECTION AND WAY-FINDING ON A PRIMARY FLIGHT DISPLAY

TECHNICAL FIELD

The technical field generally relates to the field of navigation, and more particularly relates to systems and methods for providing three-dimensional navigational aids on aerial vehicle displays.

BACKGROUND

Navigational displays may provide integrated maps that display strategic information such as flight plans, airways, approach procedures, and traffic and weather. Current directional indicators and flight directors in avionics systems may be shown using two dimensional symbology and do not show an aerial vehicle's relationship to a defined path. Further improvements are needed to increase a pilot/operator situational awareness and decrease workload for operating an aerial vehicle.

Hence, it is desirable to provide systems and methods for providing three-dimensional navigational aids on aerial vehicle displays. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In some aspects, the techniques described herein relate to a tactical navigational display system for an aerial vehicle, the system including: a display device onboard the aerial vehicle; and a controller for generating a three-dimensional (3-D) perspective projection synthetic view window for display on the display device, that depicts differences in three dimensions between a point on a defined path and the aerial vehicle at a latitude, longitude, altitude, and a given viewing angle, the 3-D perspective projection synthetic view window including: a graphical depiction of the defined path through a subsequent waypoint; and a 3-D tactical navigational symbol including a preferred intercept angle symbol at one end of the 3-D tactical navigational symbol and at least one line segment extending from the preferred intercept angle symbol and terminating at a second end of the 3-D tactical navigational symbol; wherein the controller is configured to: obtain position information of the aerial vehicle relative to the defined path of the aerial vehicle based on a current trajectory of the aerial vehicle; calculate a preferred intercept angle for the aerial vehicle to direct the aerial vehicle to a preferred track angle; render and cause the graphical depiction of the defined path to be displayed on the display device; and render and cause the 3-D tactical navigational symbol to be displayed on the display device and positioned relative to the graphical depiction of the defined path based on the preferred track angle and the intercept angle and wherein the 3-D tactical navigational symbol points at a position in front of the aerial vehicle at a desired path angle.

In some aspects, the techniques described herein relate to a processor-implemented method of providing navigational assistance during flight in an aerial vehicle, the method including: obtaining position information of the aerial vehicle relative to a defined path of the aerial vehicle based on a current trajectory of the aerial vehicle; calculating an intercept angle for the aerial vehicle to direct the aerial vehicle to a preferred track angle; generating a three-dimensional (3-D) perspective projection synthetic view window, for display on a display device, that depicts differences in three dimensions between a point on a defined path and the aerial vehicle at a latitude, longitude, altitude, and a given viewing angle, the 3-D perspective projection synthetic view window including: a graphical depiction of the defined path through a subsequent waypoint; and a 3-D tactical navigational symbol including a preferred intercept angle symbol at one end of the 3-D tactical navigational symbol and at least one line segment extending from the preferred intercept angle symbol and terminating at a second end of the 3-D tactical navigational symbol, wherein the preferred intercept angle symbol is positioned relative to the graphical depiction of the defined path based on the preferred track angle and the intercept angle and wherein the 3-D tactical navigational symbol points at a position in front of the aerial vehicle at a desired path angle; and rendering and causing the 3-D perspective projection synthetic view window including the graphical depiction of the defined path and the 3-D tactical navigational symbol to be displayed on a display device for use in navigating the aerial vehicle.

In some aspects, the techniques described herein relate to a non-transitory computer readable medium having stored thereon instructions that when executed by a processor cause the processor to perform a method including: obtaining position information of an aerial vehicle relative to a defined path of the aerial vehicle based on a current trajectory of the aerial vehicle; calculating an intercept angle for the aerial vehicle to direct the aerial vehicle to a preferred track angle; generating a three-dimensional (3-D) perspective projection synthetic view window, for display on a display device, that depicts differences in three dimensions between a point on a defined path and the aerial vehicle at a latitude, longitude, altitude, and a given viewing angle, the 3-D perspective projection synthetic view window including: a graphical depiction of the defined path through a subsequent waypoint; and a 3-D tactical navigational symbol including a preferred intercept angle symbol at one end of the 3-D tactical navigational symbol and at least one line segment extending from the preferred intercept angle symbol and terminating at a second end of the 3-D tactical navigational symbol, wherein the preferred intercept angle symbol is positioned relative to the graphical depiction of the defined path based on the preferred track angle and the intercept angle and wherein the 3-D tactical navigational symbol points at a position in front of the aerial vehicle at a desired path angle; and rendering and causing the 3-D perspective projection synthetic view window including the graphical depiction of the defined path and the 3-D tactical navigational symbol to be displayed on a display device for use in navigating the aerial vehicle.

Furthermore, other desirable features and characteristics will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein:

FIG. 10 is a process flow chart depicting an example method for positioning a 3-D tactical navigational symbol, in accordance with embodiments;

DETAILED DESCRIPTION

Figure 1:
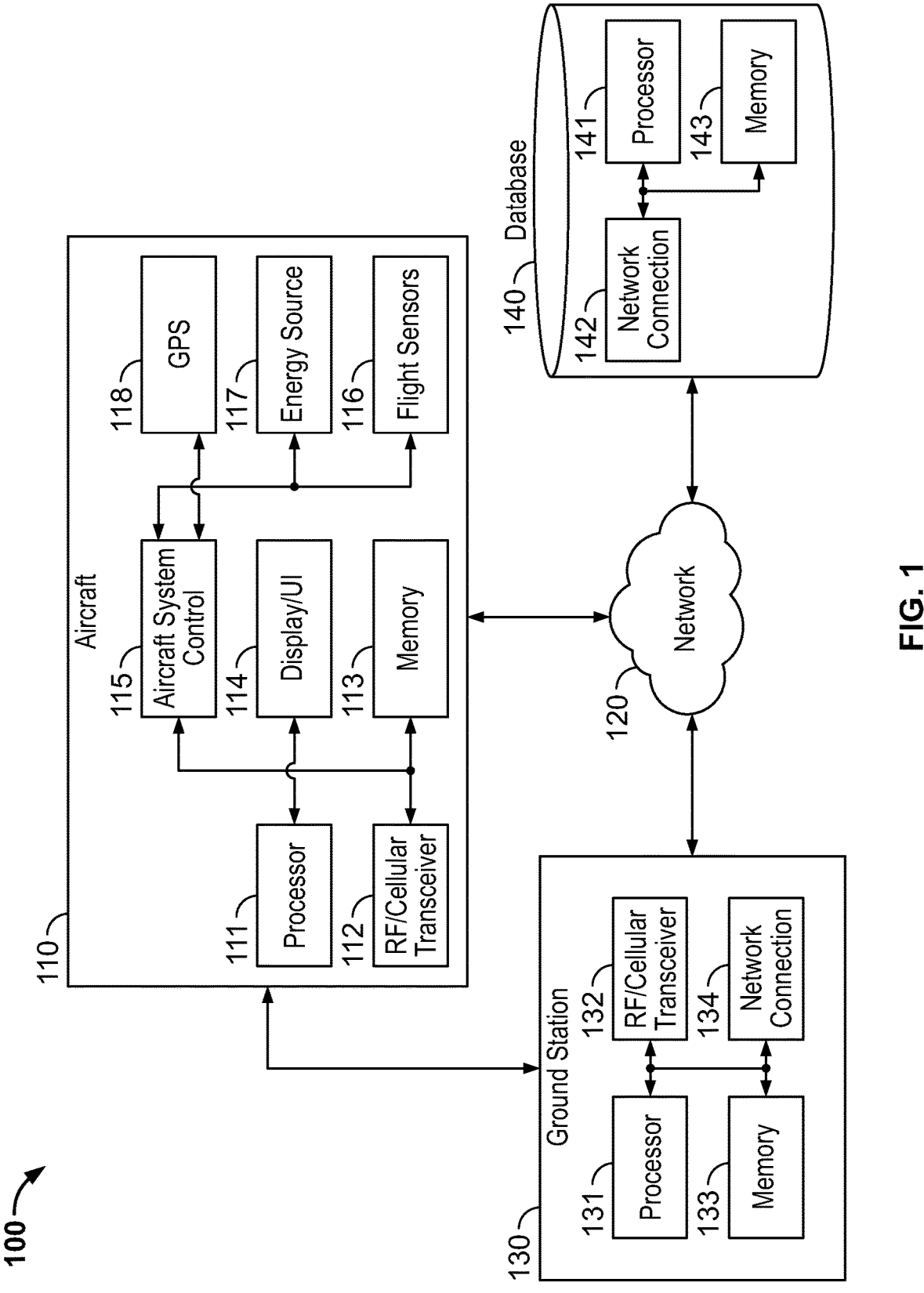
FIG. 1 depicts an example of a system environment in which systems, methods, and other aspects of the present disclosure may be implemented, in accordance with some embodiments.

The following detailed description is merely exemplary in nature and is not intended to limit the invention or the application and uses of the invention. As used herein, the words "exemplary" and "example" mean "serving as an example, instance, or illustration." Thus, any embodiment described herein as "exemplary" or "example" are not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

While this disclosure describes the systems and methods with reference to aircraft, it should be appreciated that the present systems and methods may be applicable to various other vehicles, including those of drones, automobiles, ships, spacecraft, or any other manned, unmanned, autonomous, and/or internet-connected vehicles.

An Urban Air Mobility (UAM) system is an aviation transportation system that uses highly automated aircraft that operate and transport passengers or cargo at lower altitudes within urban and suburban areas.

Glossary of Terms

Vehicle position—X, Y, Z location of the vehicle or Latitude, Longitude, Altitude of the vehicle.

Track Angle (sometimes just 'track') —The cardinal direction that the vehicle is moving over ground. (e.g., 270°).

Flight Path Angle—The angle referenced to the local tangent plane (horizon) that describes if/how the vehicle is climbing or descending. (e.g., −7°).

Flight Path Vector—The composite term combining the flight path angle and track angle describing the current trajectory of the vehicle. The flight path vector symbol is displayed on the screen to indicate the flight path vector. (e.g., Track 360° & Flight Path Angle 0°; moving north and neither descending nor ascending).

Defined flight path—At least one line or curve in space. It usually is a sequence of continuous lines and curves in space. A line may be defined by a desired track and a desired flight path angle and at least one waypoint. The line may also be defined with two waypoints and a direction such that you have a desired track angle and desired flight path angle. It may also be defined by an arc or other curved geometries such that at any given point along the curve there is a given desired flight path angle and a desired track angle.

Terrain Traced Path—A projection of the defined flight path drawn on the synthetic terrain.

Waypoint—X, Y, Z (or Latitude, Longitude, Altitude) defined location used to define a flight path.

Desired Track Angle—The cardinal angle used to define a flight path. Used with a waypoint to define a path. (e.g., 180°).

Desired Flight Path Angle—An angle that defines the slope of a flight path. (e.g., 6°).

Desired Path Angle—Used here as a composite term defining both desired flight path angle and desired track angle. (e.g., 352° & −4.2°).

Desired Path Angle Symbol—A symbol that may be placed at the desired path angle.

Aircraft Abeam Point on the Path (Aircraft Abeam Point) —The point on the flight path nearest to the aircraft. Can be defined by a Latitude, Longitude, Altitude.

Lateral Deviation—A lateral measured distance from the aircraft abeam point to the center of the aircraft. (e.g., 120 feet).

Vertical Deviation—A vertical measured distance from the altitude of the aircraft abeam point to the altitude of the center of the aircraft. (84 feet).

Aircraft Deviation—The straight-line distance from the center of the aircraft to the aircraft abeam point. (e.g., 77 feet).

Track Intercept Angle (also Lateral Intercept Angle) —The angle between the track angle and the desired track that would result in decreasing the lateral deviation. The angle is usually capped at +/−90°.

Flight Path Intercept Angle (also Vertical Intercept Angle) —The angle between the flight path angle and the desired flight path angle if the flight path angle will result in decreasing the vertical deviation. (e.g., 2°).

Intercept Angle—The angle between the flight path vector and the desired path angle. (e.g., 14°).

Preferred Track Intercept Angle—A calculated intercept track angle based on certain time constant. It could be an angle relative to the desired track or it could be a cardinal direction. (e.g. −3° from desired track or 255°).

Preferred Flight Path Intercept Angle—A calculated intercept flight path angle based on certain time constant. It could be an angle relative to the desired flight path angle or it could be an angle relative to the local tangent plane. (e.g. −3° from desired flight path angle or 6°).

Preferred Intercept Angle—A composite angle based on the preferred flight path intercept angle and the preferred flight path intercept angle. (0250 & 6°).

Preferred Intercept Angle Symbol—The symbol placed at the preferred intercept angle.

Conformal Navigation Tether Symbol (tether symbol) —The symbol that visually connects the preferred intercept angle symbol to the desired path angle.

FIG. 1 depicts an example of a system environment 100 in which systems, methods, and other aspects of the present disclosure may be implemented. The system environment 100 of FIG. 1 may include an aircraft 110, a network 120, one or more ground stations 130, and a database 140. Aircraft 110 may include processor 111 in communication with a plurality of other components such as RF/cellular transceiver 112, memory 113, display/user interface (UI) 114, aircraft control system 115, flight sensors 116, energy source 117, and GPS 118. Processor 111 may include one or more processors that comprise the computing and flight management systems of aircraft 110. Memory 113 may be one or more components configured to store data related to aircraft 110, including instructions for operating flight components and aircraft systems (e.g., autopilot, route planning, communication). Processor 111 and memory 113 may display information to and receive inputs from an operator of the aircraft 110 via the display/UI 114. The display/UI 114 may include any suitable type, such as one or more monitors, touchscreen panels, heads-up displays, heads-down displays, primary flight displays (PFDs), navigation displays, and others, and may include operator input devices such as joysticks, buttons, touch-responsive panels, mice, trackpads, voice recognition devices, and the like.

The aircraft 110 can include an aircraft control system 115 to serve as the controller of flight components and aircraft systems (e.g., control surfaces, propulsion, energy generation/management). In some embodiments, the aircraft control system 115 may communicate with a GPS 118 to, for example, locate the aircraft 110 in the airspace; an energy source 117 to, for example, manage aircraft range and speed; and flight sensors 116 to, for example, monitor the operating and flight characteristics of aircraft 110. Without deviating from the scope of this disclosure, the aircraft 110 may have additional elements that can be in communication with the aircraft control system 115 and/or processor 111.

The aircraft 110 may use an RF/cellular transceiver 112 to communicate with other elements of the system environment, for example, via the network 120 or directly by radio communication. The network 120 may be implemented as, for example, the Internet, a wireless network, Bluetooth, Near Field Communication (NFC), or any other type of network or combination of networks that provides communications between one or more components of the system environment 100. In some embodiments, the network 120 may be implemented using a suitable communication protocol or combination of protocols such as a wired or wireless Internet connection in combination with a cellular data network.

To aid and/or guide the aircraft 110, one or more ground stations 130 may provide the aircraft 110 with information, such as information regarding air traffic, weather conditions, and/or other information useful for the flight of aircraft 110. A ground station 130 may include a processor 131, an RF/cellular transceiver 132, memory 133, and network connection 134. Processor 131 and memory 133 may collect and transmit information via RF/cellular transceiver 132 and/or network connection 134. Ground station 130 may be in communication with, for example, air traffic control, meteorologists, and one or more databases 140.

One or more databases 140 may be repositories for system information such as map data, building data, flight plan data, and the like. Database 140 may include a processor 141, a network connection 142, and a memory 143. Memory 143 may store data, processor 141 may access and organize the stored data to respond to requests and provide updates to the stored data, and information may be provided to other elements in system environment 100 via network connection 142. In some embodiments, database 140 may communicate directly with aircraft 110 via network 120. Further, ground station 130 may be able to relay requests for information from aircraft 110 to database 140 via one or more of its RF/cellular transceivers 132 and network connection 134.

Figure 2:
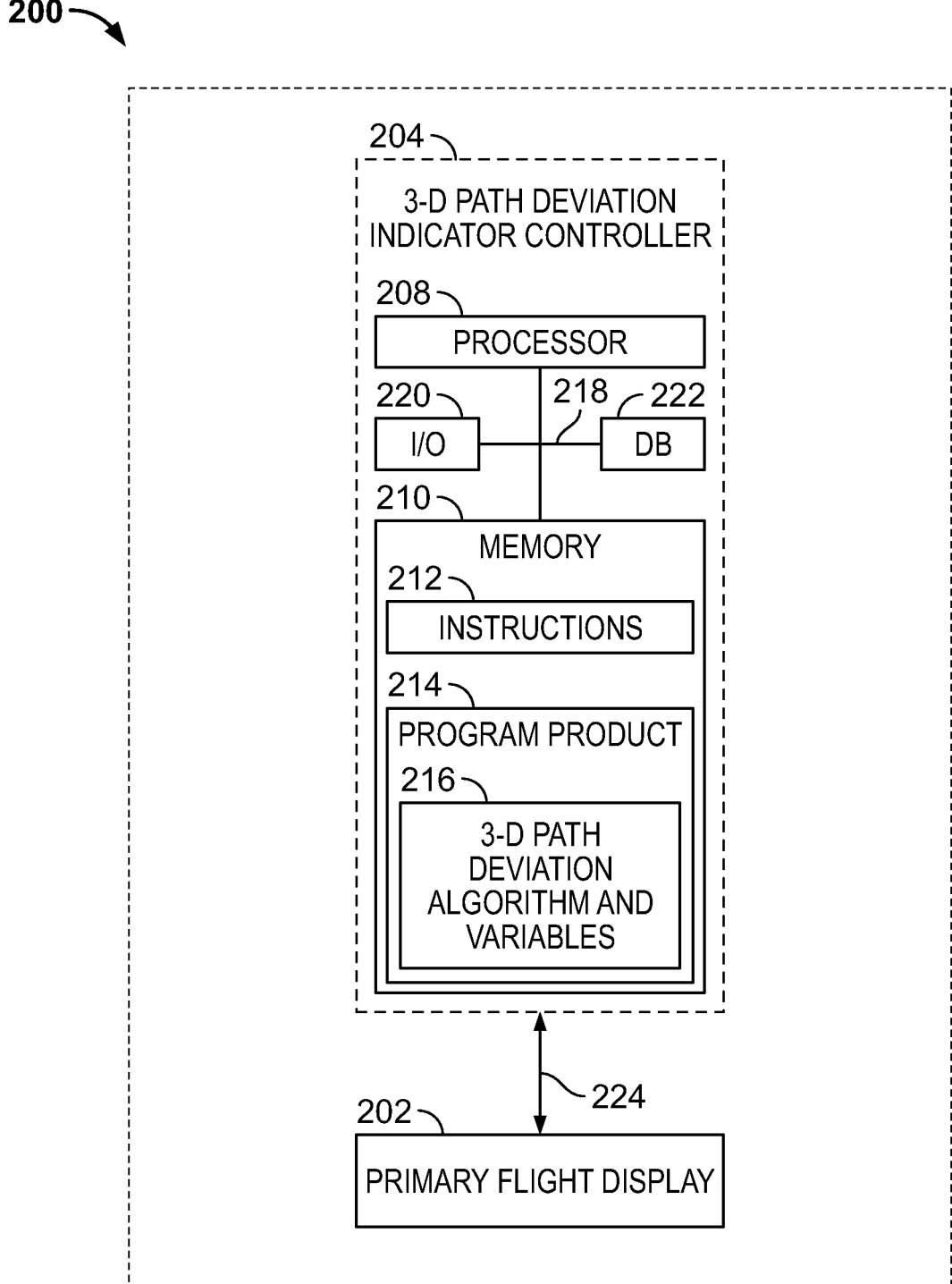
FIG. 2 is a block diagram depicting an example tactical navigational display system, in accordance with some embodiments.

FIG. 2 is a block diagram depicting an example tactical navigational display system 200. The example tactical navigational display system 200 includes a display device 202 (such as a primary flight display (PFD) and/or other display/ UI 114) and a 3-D perspective projection synthetic view controller 204. The display device 202 has at least one display unit and at least one user input mechanism. In various embodiments, the display device 202 includes a touchscreen device having at least one touchscreen display as a display unit and a touchscreen surface as a user input mechanism. In various embodiments, the display device 202 includes a mouse and/or keyboard as user input mechanisms. In various embodiments, the display device 202 may include other physical controls, such as knobs, wheels, inceptors, sticks, or others.

The example 3-D perspective projection synthetic view controller 204 includes a processing component comprising at least one processor 208 and a computer-readable storage device or media (such as memory 210) encoded with programming instructions for configuring the processing component. The processor 208 may comprise any type of processor or multiple processors, any custom-made or commercially available processor, a central processing unit (CPU), a graphics processing unit (GPU), an application specific integrated circuit (ASIC), a field programmable gate array (FPGA), an auxiliary processor among several processors associated with the processing component, a semiconductor-based microprocessor (in the form of a microchip or chip set), any combination thereof, or generally any device for executing instructions to carry out the described operations, tasks, and functions by manipulating electrical signals representing data bits at memory locations in system memory, as well as other processing of signals.

The computer readable storage device or media (e.g., memory 210) may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the processing component. The memory 210 may be located on and/or co-located on the same computer chip as the processor 208. Generally, the memory 210 maintains data bits and may be utilized by the processor 208 as storage and/or a scratch pad during operation. Specifically, the memory 210 stores instructions and applications 212. Information in the memory 210 may be organized and/or imported from an external source during an initialization step of a process; it may also be programmed via a user input device (e.g., associated with the Display device 202). During operation, the processor 208 loads and executes one or more programs, algorithms and rules embodied as instructions and applications 212 contained within the memory 210 and, as such, controls the general operation of the 3-D perspective projection synthetic view controller 204.

The memory 210 includes a novel program 216 that includes rules and instructions that, when executed, convert the processing component (e.g., processor 208/memory 210) configuration into the 3-D perspective projection synthetic view controller 204, which is a novel controller that performs the functions, techniques, and processing tasks associated with depicting differences in three dimensions between a point on a defined path and the aerial vehicle at a latitude, longitude, altitude, and a given viewing angle. The novel program 216 directs the processing of position information of the aerial vehicle relative to the defined path, calculating an intercept point along the defined path for the aerial vehicle, rendering and causing a graphical depiction of the defined path to be displayed on the display device 202, and rendering and causing a 3-D tactical navigational symbol to be displayed at a position on the display device 202 based on the intercept point, wherein the 3-D tactical navigational symbol points at a position along the defined path. The novel program 216 and associated stored variables may be stored in a functional form on computer readable media, for example, as depicted, in memory 210. While the depicted exemplary embodiment of the GCS controller is described in the context of a fully functioning computer system, those skilled in the art will recognize that the mechanisms of the present disclosure are capable of being distributed as a program product 214.

As a program product 214, one or more types of non-transitory computer-readable signal bearing media may be used to store and distribute the program 216, such as a non-transitory computer readable medium bearing the program 216 and containing therein additional computer instructions for causing a computer processor (such as the processor 208) to load and execute the program 216. Such a program product 214 may take a variety of forms, and the present disclosure applies equally regardless of the type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized as memory 210 in certain embodiments.

In various embodiments, the processing component (e.g., processor 208/memory 210) configuration of the 3-D perspective projection synthetic view controller 204 may be communicatively coupled (via a bus 218) to an input/output (I/O) interface 220, and a database 222. The bus 218 serves to transmit programs, data, status and other information or signals between the various components of the 3-D perspective projection synthetic view controller 204. The bus 218 can be any suitable physical or logical means of connecting computer systems and components. This includes, but is not limited to, direct hard-wired connections, fiber optics, infrared and wireless bus technologies.

The I/O interface 220 enables intra controller communication, as well as communications between the 3-D perspective projection synthetic view controller 204 and other system components (such as a PFD 202) via the communication system and fabric 224 and between the 3-D perspective projection synthetic view controller 204 and external data sources via the communication system and fabric 224. The I/O interface 220 may include one or more network interfaces and can be implemented using any suitable method and apparatus. In various embodiments, the I/O interface 220 is configured to support communication from an external system driver and/or another computer system. In one embodiment, the I/O interface 220 is integrated with the communication system and fabric 224 and obtains data from external data source(s) directly. Also, in various embodiments, the I/O interface 220 may support communication with technicians, and/or one or more storage interfaces for direct connection to storage apparatuses, such as the database 222. In some embodiments, the database 222 is part of the memory 210. In various embodiments, the database 222 is integrated, either within the 3-D perspective projection synthetic view controller 204 or external to it.

The example 3-D perspective projection synthetic view controller 204 is configured to obtain position information of the aerial vehicle relative to the defined path, calculate a preferred intercept angle along the defined path for the aerial vehicle, render and cause the graphical depiction of the defined path to be displayed on a three-dimensional (3-D) perspective projection synthetic view window on the display device, and render and cause the 3-D tactical navigational symbol to be displayed at a position on the 3-D) synthetic view window based on the intercept point, wherein the 3-D tactical navigational symbol points at the desired path angle.

Figure 3:
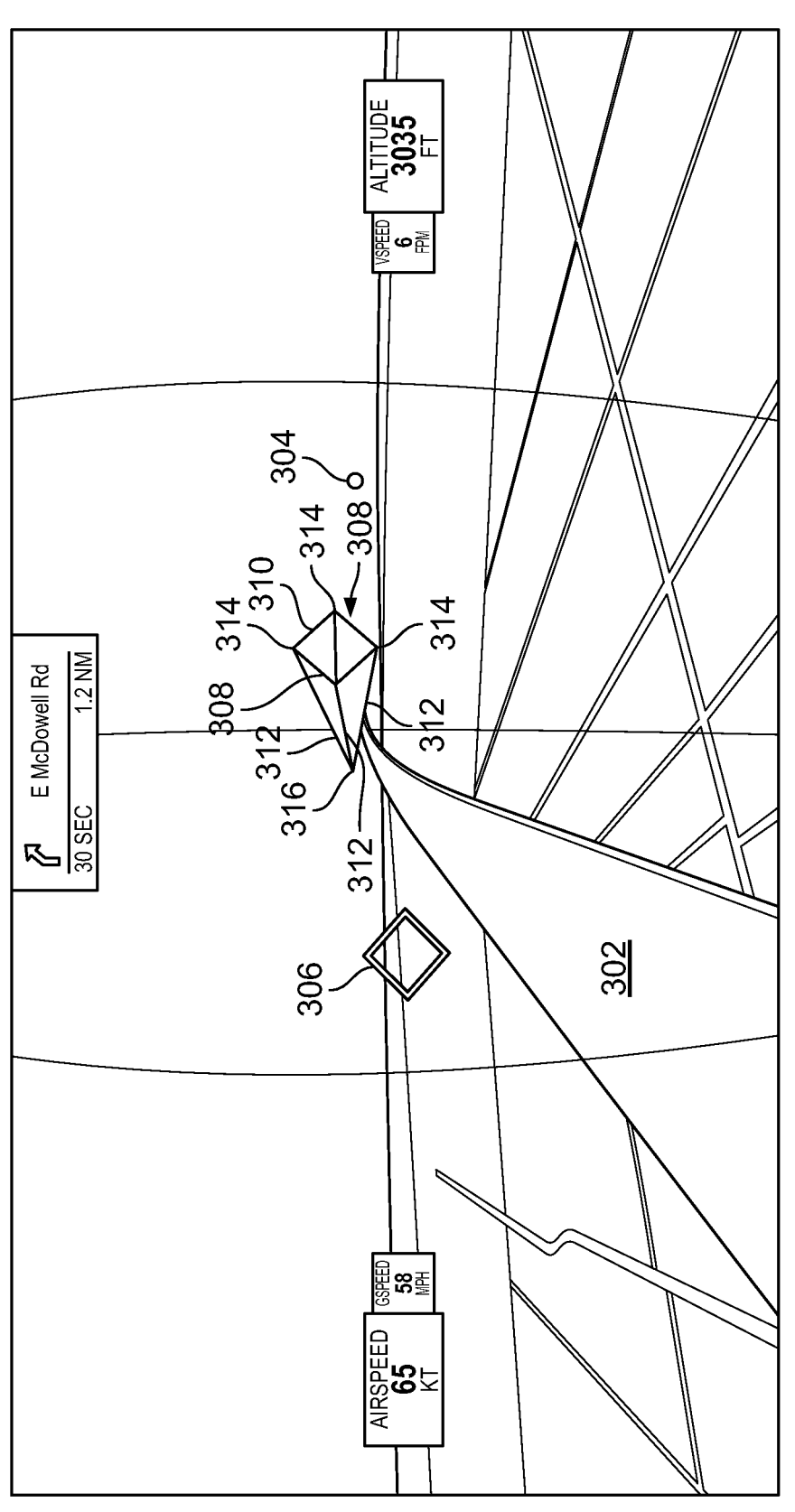
FIG. 3 depicts an example three-dimensional (3-D) perspective projection synthetic view window that may be generated by a 3-D perspective projection synthetic view controller for display on a display device, in accordance with some embodiments.

FIG. 3 depicts an example three-dimensional (3-D) perspective projection synthetic view window 300 that depicts differences in three dimensions between a point on a defined path and the aerial vehicle at a latitude, longitude, altitude, and a given viewing angle and that may be generated by the 3-D perspective projection synthetic view controller 204 for display on a display device (such as display/UI 114 and/or display device 202). The example 3-D perspective projection synthetic view window 300 includes a graphical depiction of an aerial vehicle's defined path 302 through a subsequent waypoint 304 and beyond.

The example 3-D perspective projection synthetic view window 300 also includes a preferred intercept angle symbol 306 and a 3-D tactical navigational symbol 308. The preferred intercept angle symbol 306 is positioned above the graphical depiction of the defined path 302 at a predetermined measurement (e.g., 8 seconds) ahead of the aerial vehicle along the defined path 302. In this example, the preferred intercept angle symbol 306 is depicted as having a diamond shape. Other shapes may be used in other embodiments.

The 3-D tactical navigational symbol 308 includes a preferred intercept angle symbol 310 (e.g., a diamond shape symbol, some other closed shape symbol, or an open shape symbol) at an end section and a plurality of tether symbols 312 (which appear as line segments) extending from vertices 314 of the preferred intercept angle symbol 310 and converging at an end point 316 that is positioned between the preferred intercept angle symbol 310 and the preferred intercept angle symbol 306. In this example, the plurality of tether symbols 312 and the preferred intercept angle symbol 310 cooperate to form the 3-D tactical navigational symbol 308 as a 4-sided pyramid. In this example, the preferred intercept angle symbol 310 has a diamond shape. Other shapes may be used in other embodiments.

The example 3-D tactical navigational symbol 308 is caged on the 3-D perspective projection synthetic view window 300 in front of the aerial vehicle with the preferred intercept angle symbol 310 positioned based on the aerial vehicle's relative position with respect to the defined path 302 and with the 3-D tactical navigational symbol 308 pointing at the preferred intercept angle symbol 306. The positioning of the 3-D tactical navigational symbol 308 on the 3-D perspective projection synthetic view window 300 provides a pilot of the aerial vehicle with a view that can be used to direct the aerial vehicle back onto the defined path 302.

As the pilot directs the aerial vehicle toward the defined path 302, the position and orientation of the 3-D tactical navigational symbol 308 changes such that the plurality of tether symbols 312 appear to decrease in size and the preferred intercept angle symbol 310 moves closer to the preferred intercept angle symbol 306. When the aerial vehicle reaches the defined path 302, the position and orientation of the 3-D tactical navigational symbol 308 changes such that the preferred intercept angle symbol 310 overlays the plurality of tether symbols 312 and the preferred intercept angle symbol 306.

Figure 4:
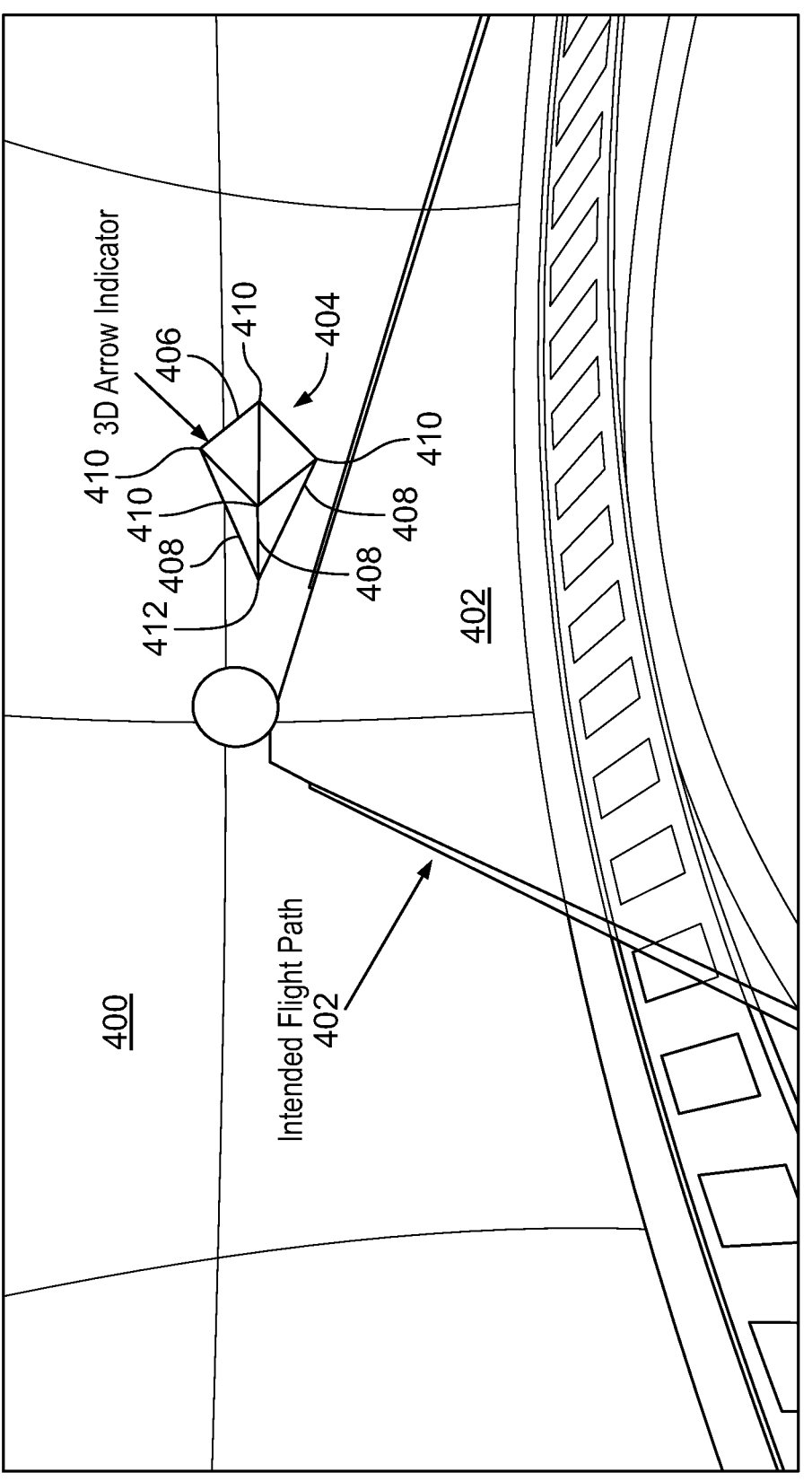
FIG. 4 depicts another example 3-D perspective projection synthetic view window that may be generated for display, in accordance with some embodiments.

FIG. 4 depicts another example three-dimensional (3-D) perspective projection synthetic view window 400 that depicts differences in three dimensions between a point on a defined path and the aerial vehicle at a latitude, longitude, altitude, and a given viewing angle and that may be generated by the 3-D perspective projection synthetic view controller 204 for display on a display device (such as display/UI 114 and/or display device 202). The example 3-D perspective projection synthetic view window 400 includes a graphical depiction of a defined path 402 from an aerial vehicle's current position through a subsequent waypoint (not shown) and beyond.

The example 3-D perspective projection synthetic view window 400 also includes a 3-D tactical navigational symbol 404 (e.g., 3-D Arrow Indicator). The 3-D tactical navigational symbol 404 is positioned above the graphical depiction of the defined path 402 at a predetermined measurement (e.g., 8 seconds) ahead of the aerial vehicle along the defined path 402.

The 3-D tactical navigational symbol 404 includes a preferred intercept angle symbol 406 at an end section and a plurality of tether symbols 408 (which appear as line segments) extending from vertices 410 of the preferred intercept angle symbol 406 and converging at an end point 412 that is positioned ahead of the preferred intercept angle symbol 406 along the direction of the defined path 402. In various embodiments the preferred intercept angle symbol has a closed shape. The preferred intercept angle symbol 406 is positioned at the predetermined measurement (e.g., 8 seconds) ahead of the aerial vehicle along the defined path 402. In this example, the preferred intercept angle symbol 406 has a diamond shape. Other shapes may be used in other embodiments. In this example, the plurality of tether symbols 408 and the preferred intercept angle symbol 406 cooperate to form the 3-D tactical navigational symbol 404 as a 4-sided pyramid.

The example 3-D tactical navigational symbol 404 is positioned on the 3-D perspective projection synthetic view window 400 in front of the aerial vehicle with the preferred intercept angle symbol 406 positioned based on the aerial vehicle's relative position with respect to the defined path 402 and with the 3-D tactical navigational symbol 404 pointing toward the vanishing point of the defined path 402. The positioning of the 3-D tactical navigational symbol 404 on the 3-D perspective projection synthetic view window 400 provides a pilot of the aerial vehicle with a view that can be used to direct the aerial vehicle back onto the defined path 402.

In the example of FIG. 4, the preferred intercept angle symbol 406 is positioned at a location to the right of desired path angle (which is located at the vanishing point of defined path 402. This indicates to the pilot that the aerial vehicle is to the left of the defined path 402 and the pilot may steer the aerial vehicle to the right to position the aerial vehicle on the defined path 402.

As the pilot of the aerial vehicle steers the aerial vehicle to the right, the pilot directs the aerial vehicle toward the defined path 402, the position and orientation of the 3-D tactical navigational symbol 404 changes, and the plurality of tether symbols 408 appear to decrease in size. When the aerial vehicle reaches the defined path 402, the position and orientation of the 3-D tactical navigational symbol 404 changes such that the preferred intercept angle symbol 406 overlays the plurality of tether symbols 408.

In various embodiments, the 3-D tactical navigational symbol 404 may be angled up or down. In various embodiments, when the 3-D tactical navigational symbol is angled up, the aerial vehicle is below the defined path and the pilot can increase its flight path angle to reach the defined path 402. In various embodiments, when the 3-D tactical navigational symbol is angled down, the aerial vehicle is above the defined path and the pilot can decrease its flight path angle to reach the defined path 402.

Figure 5:
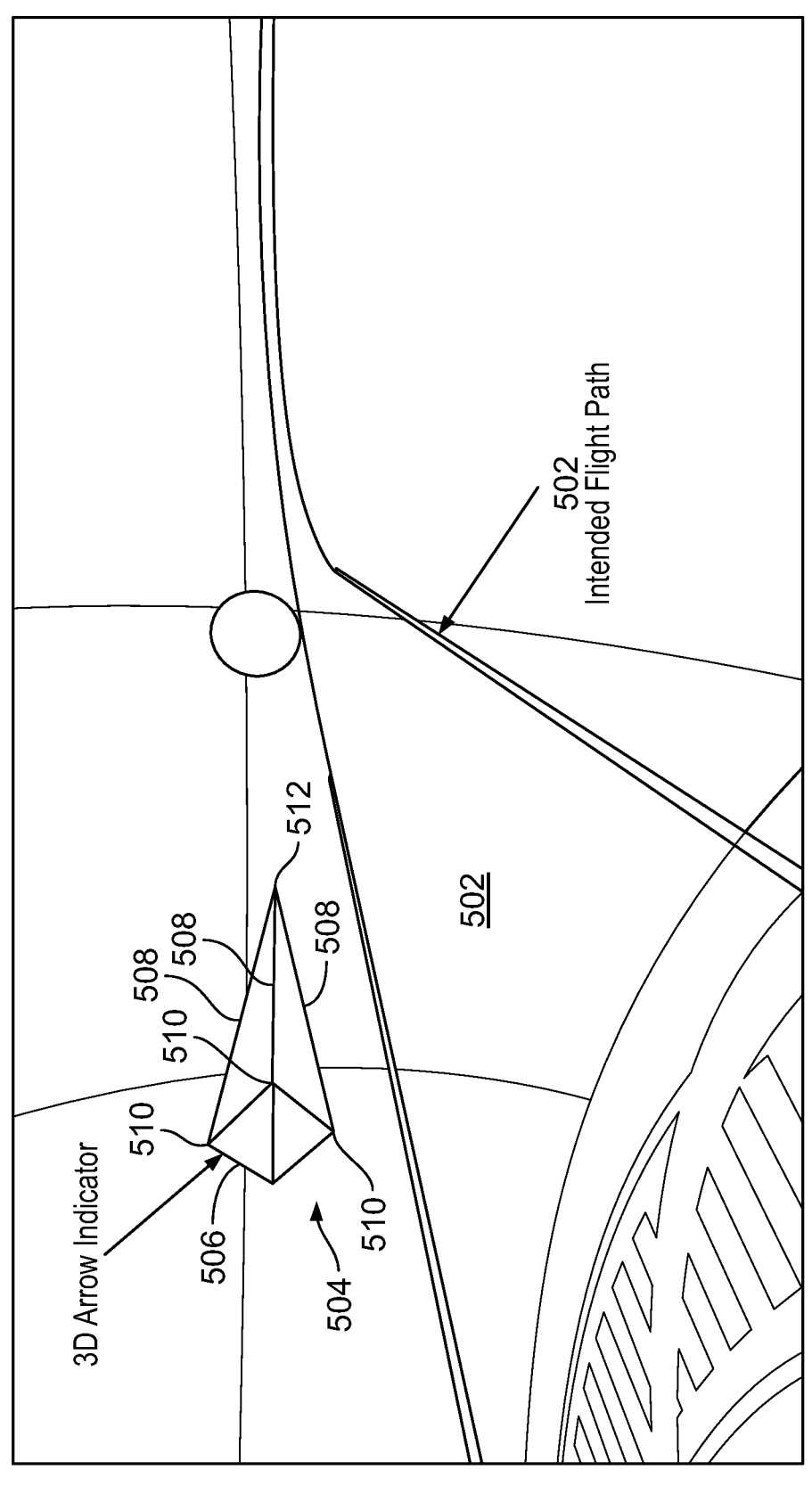
FIG. 5 depicts another example 3-D perspective projection synthetic view window that may be generated for display, in accordance with some embodiments.

FIG. 5 depicts another example three-dimensional (3-D) perspective projection synthetic view window 500 that depicts differences in three dimensions between a point on a defined path and the aerial vehicle at a latitude, longitude, altitude, and a given viewing angle and that may be generated by the 3-D perspective projection synthetic view controller 204 for display on a display device (such as display/UI 114 and/or display device 202). The example 3-D perspective projection synthetic view window 500 includes a graphical depiction of a defined path 502 from an aerial vehicle's current position through a subsequent waypoint (not shown) and beyond.

The example 3-D perspective projection synthetic view window 500 also includes a 3-D tactical navigational symbol 504 (e.g., 3D Arrow Indicator). The 3-D tactical navigational symbol 504 is positioned above the graphical depiction of the defined path 502 at a predetermined measurement (e.g., 8 seconds) ahead of the aerial vehicle along the defined path 502.

The 3-D tactical navigational symbol 504 includes a preferred intercept angle symbol 506 at an end section and a plurality of tether symbols 508 (which appear as line segments) extending from vertices 510 of the preferred intercept angle symbol 506 and converging at an end point 512 that is positioned ahead of the preferred intercept angle symbol 506 along the direction of the defined path 502. The preferred intercept angle symbol 506 is positioned at the predetermined measurement (e.g., 8 seconds) ahead of the aerial vehicle along the defined path 502. In this example, the preferred intercept angle symbol 506 has a diamond shape. Other shapes may be used in other embodiments. In this example, the plurality of tether symbols 508 and the preferred intercept angle symbol 506 cooperate to form the 3-D tactical navigational symbol 504 as a 4-sided pyramid.

The example 3-D tactical navigational symbol 504 is positioned on the 3-D perspective projection synthetic view window 300 in front of the aerial vehicle with the preferred intercept angle symbol 506 positioned based on the aerial vehicle's relative position with respect to the defined path 502 and with the 3-D tactical navigational symbol 504 pointing toward the vanishing point of the defined path 502. The positioning of the 3-D tactical navigational symbol 504 on the 3-D perspective projection synthetic view window 500 provides a pilot of the aerial vehicle with a view that can be used to direct the aerial vehicle back onto the defined path 502.

In the example of FIG. 5, the preferred intercept angle symbol 506 is positioned at a location to the left of the desired path angle (which is located at the vanishing point of the defined path 502. This indicates to the pilot that the aerial vehicle is to the right of the defined path 502 and the pilot may steer the aerial vehicle to the left to position the aerial vehicle on the defined path 502.

As the pilot of the aerial vehicle steers the aerial vehicle to the left, the pilot directs the aerial vehicle toward the defined path 502, the position and orientation of the 3-D tactical navigational symbol 504 changes, and the plurality of tether symbols 508 appear to decrease in size. When the aerial vehicle reaches the defined path 502, the position and orientation of the 3-D tactical navigational symbol 504 changes such that the preferred intercept angle symbol 506 overlays the plurality of tether symbols 508.

In various embodiments, the 3-D tactical navigational symbol 504 may be angled up or down. In various embodiments, when the 3-D tactical navigational symbol is angled up, the aerial vehicle is below the defined path and the pilot can increase its flight path angle to reach the defined path 502. In various embodiments, when the 3-D tactical navigational symbol is angled down, the aerial vehicle is above the defined path and the pilot can decrease its flight path angle to reach the defined path 502.

Figure 6:
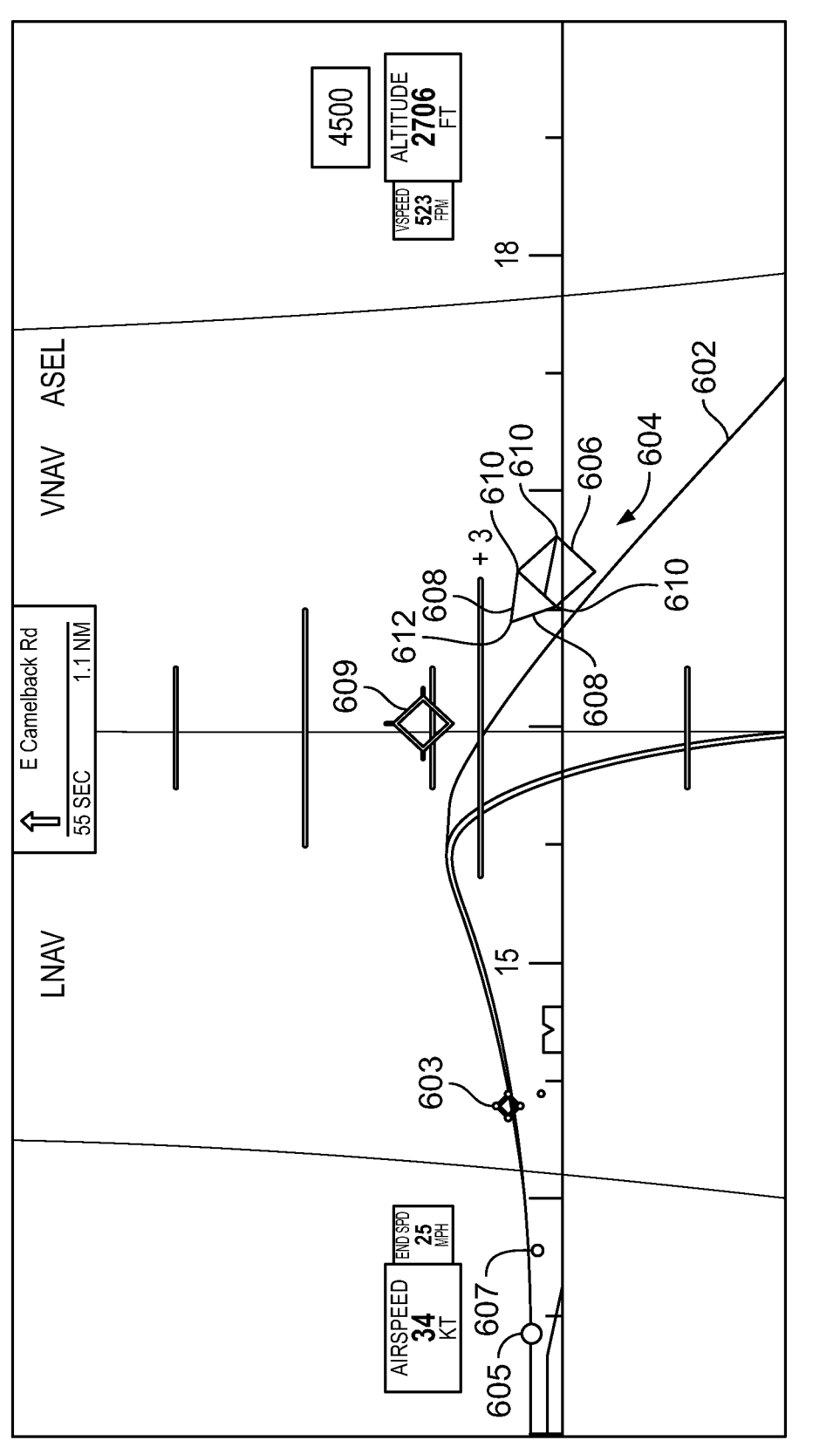
FIG. 6 depicts another example 3-D perspective projection synthetic view window that may be generated for display, in accordance with some embodiments.

FIG. 6 depicts another example three-dimensional (3-D) perspective projection synthetic view window 600 that depicts differences in three dimensions between a point on a defined path and the aerial vehicle at a latitude, longitude, altitude, and a given viewing angle and that may be generated by the 3-D perspective projection synthetic view controller 204 for display on a display device (such as display/UI 114 and/or display device 202). The example 3-D perspective projection synthetic view window 600 includes a graphical depiction (through space) of a defined path 602 from an aerial vehicle's current position through three subsequent waypoints (603/605/607) and beyond.

The example 3-D perspective projection synthetic view window 600 also includes a flight path vector symbol 609 and a 3-D tactical navigational symbol 604 (e.g., 3D Arrow Indicator). The flight path vector symbol 609 is positioned above the graphical depiction of the defined path 602 at a defined path location at predetermined measurement (e.g., 8 seconds) ahead of the aerial vehicle along the defined path 602. In this example, the flight path vector symbol 609 is depicted as having a diamond shape. Other shapes may be used in other embodiments.

The 3-D tactical navigational symbol 604 is positioned above the graphical depiction of the defined path 602 at a predicted path location at a predetermined measurement (e.g., 8 seconds) ahead of the aerial vehicle along the defined path 602. The 3-D tactical navigational symbol 604 includes a preferred intercept angle symbol 606 at an end section and a plurality of tether symbols 608 (which appear as line segments) extending from vertices 610 of the preferred intercept angle symbol 606 and converging at an end point 612 that is positioned ahead of the preferred intercept angle symbol 606 along the direction of the defined path 602. The preferred intercept angle symbol 606 is positioned at the predetermined measurement (e.g., 8 seconds) ahead of the aerial vehicle along the defined path 602. In this example, the preferred intercept angle symbol 606 has a diamond shape. Other shapes may be used in other embodiments. In this example, the plurality of tether symbols 608 and the preferred intercept angle symbol 606 cooperate to form the 3-D tactical navigational symbol 604 as a 4-sided pyramid.

The example 3-D tactical navigational symbol 604 is positioned on the 3-D perspective projection synthetic view window 600 in front of the aerial vehicle with the preferred intercept angle symbol 606 positioned based on the aerial vehicle's relative position with respect to the defined path 602 and with the 3-D tactical navigational symbol 604 pointing toward the forward path symbol 603. The positioning of the 3-D tactical navigational symbol 604 on the 3-D perspective projection synthetic view window 600 provides a pilot of the aerial vehicle with a view that can be used to direct the aerial vehicle back onto the defined path 602.

In the example of FIG. 6, the preferred intercept angle symbol 606 is positioned at a location to the right of desired path angle (which is located at the vanishing point of defined path 602. This indicates to the pilot that the aerial vehicle is to the left of the defined path 502 and the pilot may steer the aerial vehicle to the right to position the aerial vehicle on the defined path 602.

As the pilot of the aerial vehicle steers the aerial vehicle to the right, the pilot directs the aerial vehicle toward the defined path 602, the position and orientation of the 3-D tactical navigational symbol 604 changes such that the plurality of tether symbols 608 appear to decrease in size and the preferred intercept angle symbol 606 moves closer to the flight path vector symbol 609. When the aerial vehicle reaches the defined path 602, the position and orientation of the 3-D tactical navigational symbol 604 changes such that the preferred intercept angle symbol 606 overlays the plurality of tether symbols 608 and the flight path vector symbol 609.

FIGS. 7A-7D depicts example three-dimensional (3-D) perspective projection synthetic view windows (700, 720, 740, 760) at different stages during flight that depict differences in three dimensions between a point on a defined path and the aerial vehicle at a latitude, longitude, altitude, and a given viewing angle and that may be generated by the 3-D perspective projection synthetic view controller 204 for display on a display device (such as display/UI 114 and/or display device 202). The example 3-D perspective projection synthetic view windows (700, 720, 740, 760) include a graphical depiction of a defined terrain traced path 702 from an aerial vehicle's current position through subsequent waypoints (e.g., waypoints 703/705) and beyond.

The example 3-D perspective projection synthetic view windows (700, 720, 740, 760) also include a 3-D tactical navigational symbol 704. The 3-D tactical navigational symbol 704 is positioned above the graphical depiction of the defined terrain traced path 702 at a predetermined measurement (e.g., 8 seconds) ahead of the aerial vehicle along the defined terrain traced path 702.

The 3-D tactical navigational symbol 704 includes a preferred intercept angle symbol 706 at an end section and a plurality of tether symbols 708 (which appear as line segments) extending from vertices 710 of the preferred intercept angle symbol 706 to vertices of the next waypoint 703 and converging at an end point (not shown) at the desired path angle (not shown) of tether symbols 708 (e.g., 315° NW and 0° flight path angle) defined terrain traced path 702. The preferred intercept angle symbol 706 is positioned at the predetermined measurement (e.g., 8 seconds) ahead of the aerial vehicle along the defined path 702. The end point is positioned ahead of the preferred intercept angle symbol 706 along the direction of the defined terrain traced path 702. In this example, the preferred intercept angle symbol 706 has a diamond shape. Other shapes may be used in other embodiments. In this example, the plurality of tether symbols 708 and the preferred intercept angle symbol 706 cooperate to form the 3-D tactical navigational symbol 704.

The example 3-D tactical navigational symbol 704 is positioned on the 3-D perspective projection synthetic view windows (700, 720, 740, 760) in front of the aerial vehicle with the preferred intercept angle symbol 706 positioned based on the aerial vehicle's relative vertical and lateral position with respect to the defined terrain traced path 702 and with the 3-D tactical navigational symbol 704 pointing toward the vanishing point of the defined terrain traced path 702 3-D tactical navigational symbol 704 at the desired path angle (combination of the desired flight path angle and the desired track angle). The positioning of the 3-D tactical navigational symbol 704 on the 3-D perspective projection synthetic view window 700 provides a pilot of the aerial vehicle with a view that can be used to direct the aerial vehicle back onto the defined terrain traced path 702.

The example 3-D perspective projection synthetic view window 700 also includes a flight path vector symbol 712 and a plurality of flight path angle reference lines including a first flight path angle reference line 714 and a second flight path angle reference line 716. In this example, the flight path vector symbol 712 indicates the flight path vector of the aerial vehicle. It is relative to the aerial vehicle location. One of the flight path angle reference lines corresponds to a desired flight path angle for the defined path, and as a pilot steers the aerial vehicle to the desired flight path angle the flight path vector symbol 712 moves to overlap the flight path angle reference line that corresponds to a desired flight path angle for the defined path.

Figure 7A:
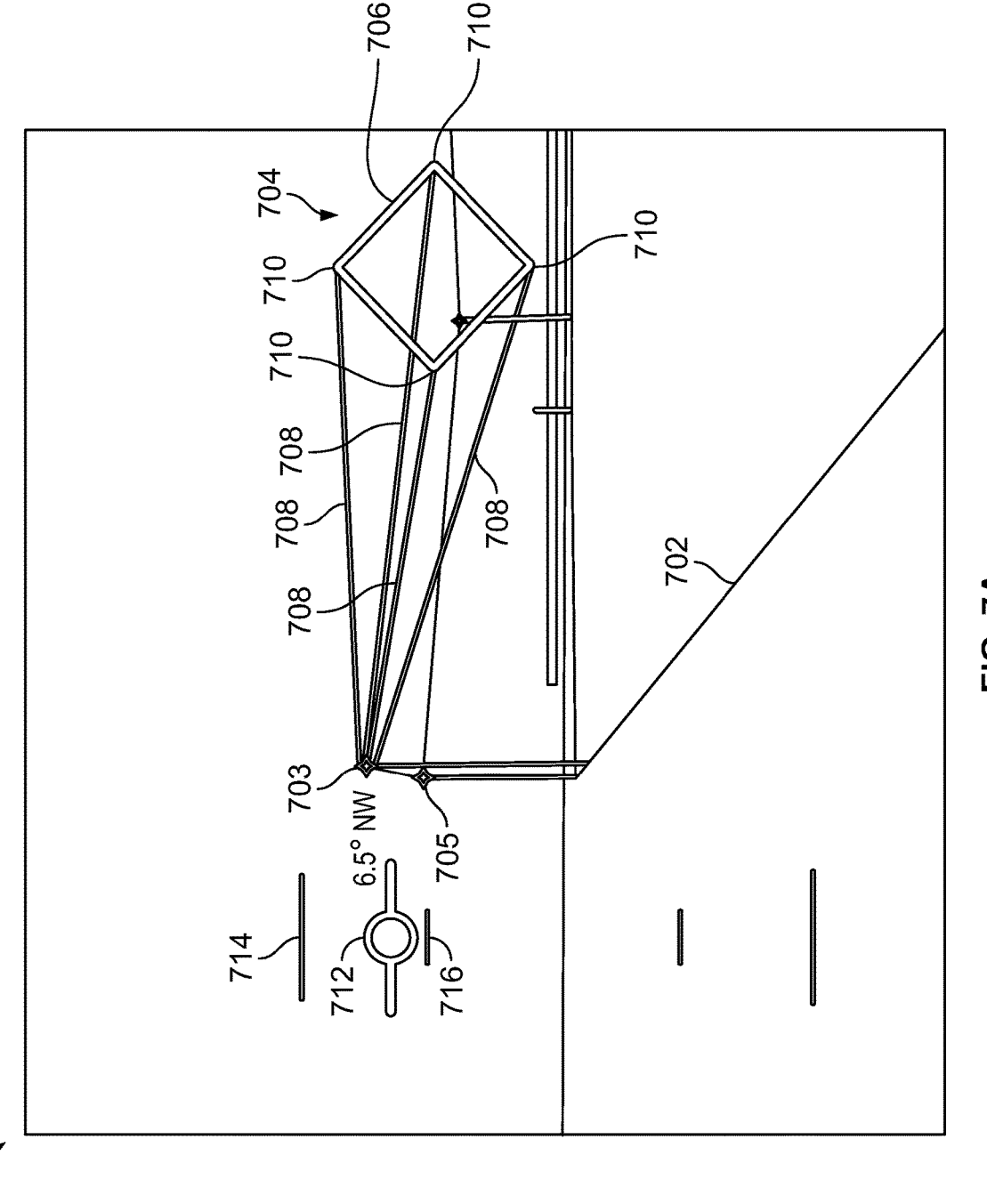
FIGS. 7A-7D depict example three-dimensional 3-D perspective projection synthetic view windows at different stages during flight for display, in accordance with some embodiments

In the example of FIG. 7A, the flight path vector symbol 712 is positioned to the left of the preferred intercept angle symbol 706. defined terrain traced path 702 The flight path vector symbol 712 is positioned to the left of the preferred intercept angle symbol 706. This indicates to the pilot that the pilot must steer the track of the vehicle to the right to align with the preferred intercept angle to start aligning to the defined path. The waypoint 703 (or the invisible desired path angle) is positioned to the left of the preferred intercept angle symbol 706 (e.g., preferred intercept angle). This indicates to the pilot that the aerial vehicle is to the left of the defined path (not shown explicitly but indicated by the 3-D tactical navigational symbol 704) and the pilot may steer the vehicle to the right position. Also, the flight path vector symbol 712 is positioned above the center of the preferred intercept angle symbol 706. This indicates to the pilot that the aerial vehicle's flight path angle is lower than the desired flight path angle but not much lower than the aerial vehicle's preferred flight path angle.

Figure 7B:
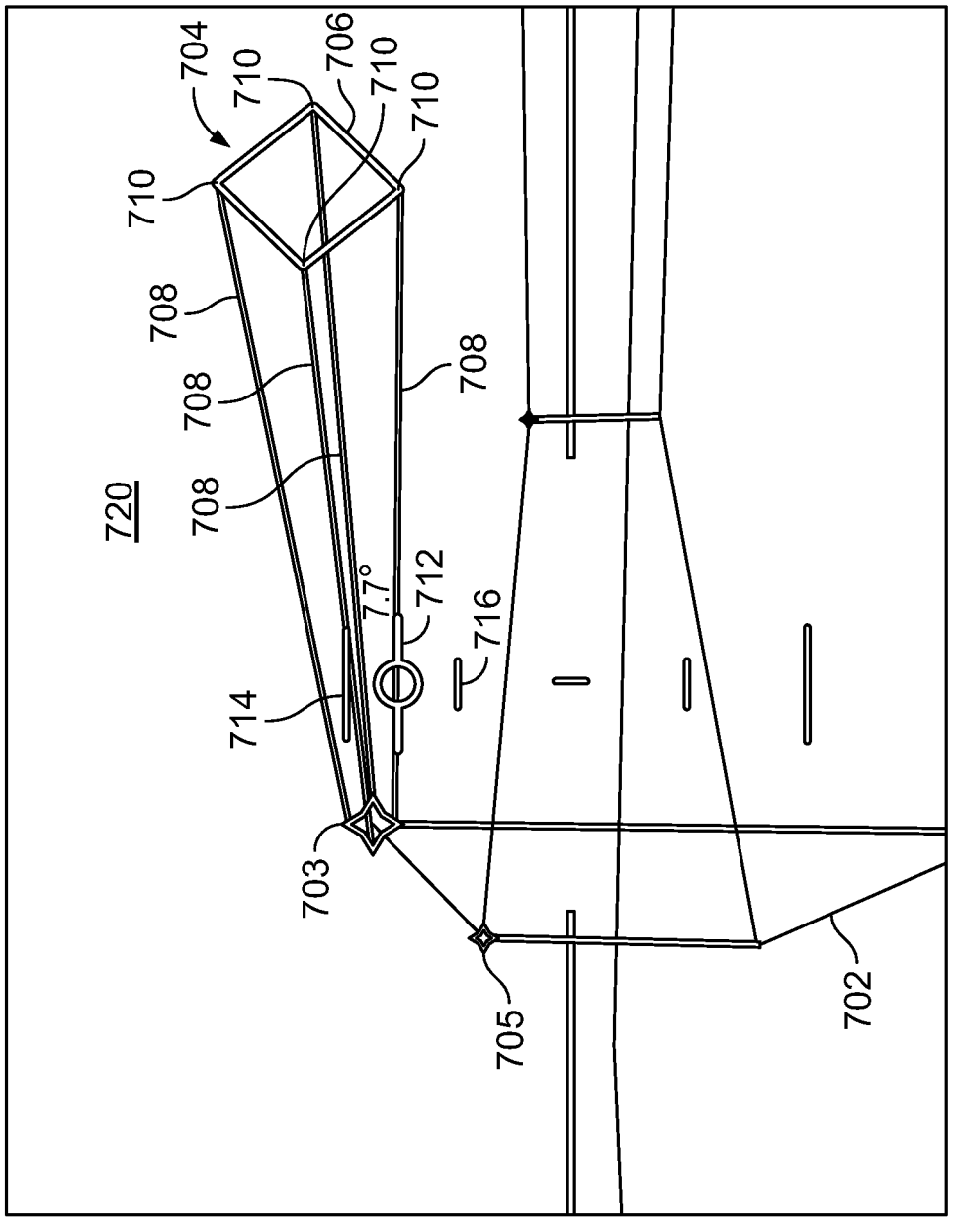

As illustrated in FIG. 7B, as the pilot of the aerial vehicle steers the aerial vehicle to the right, the pilot directs the aerial vehicle closer toward the preferred track intercept angle, the position of the flight path vector symbol 712 changes relative to the preferred intercept angle symbol 706, the length of the plurality of tether symbols 708 shorten, and the flight path vector symbol 712 moves closer to the preferred intercept angle symbol 706. Also, changes to the aerial vehicle's flight path angle result in the center of the flight path vector symbol 712 moving above or below the center of the preferred intercept angle symbol 706.

Figure 7C:
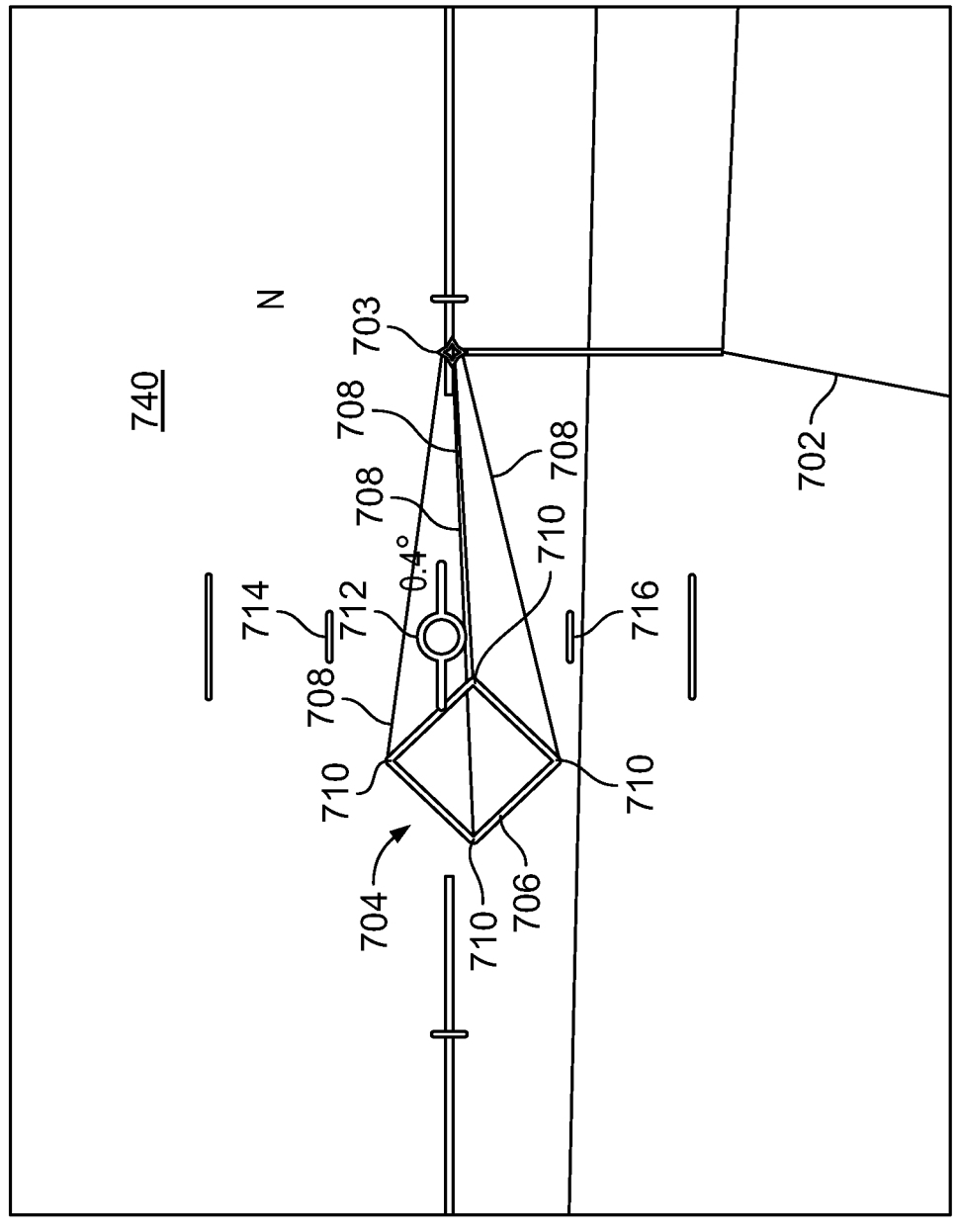

In the example of FIG. 7C, the preferred intercept angle symbol 706 is positioned to the left of the vanishing point of the tether symbols 708. This indicates to the pilot that the aerial vehicle is to the right of the defined path 702 and the pilot may steer the aerial vehicle to the left to position the aerial vehicle on the defined terrain traced path 702. The flight path vector symbol 712 is positioned to the right of the preferred intercept angle symbol 706 but right of the vanishing point of the tether symbols 708. This indicates to the pilot that the aerial vehicle is on an intercept trajectory. The pilot may steer the aerial vehicle to the left to more closely align with the preferred intercept angle or may maintain that flight path for a slower intercept.

Figure 7D:
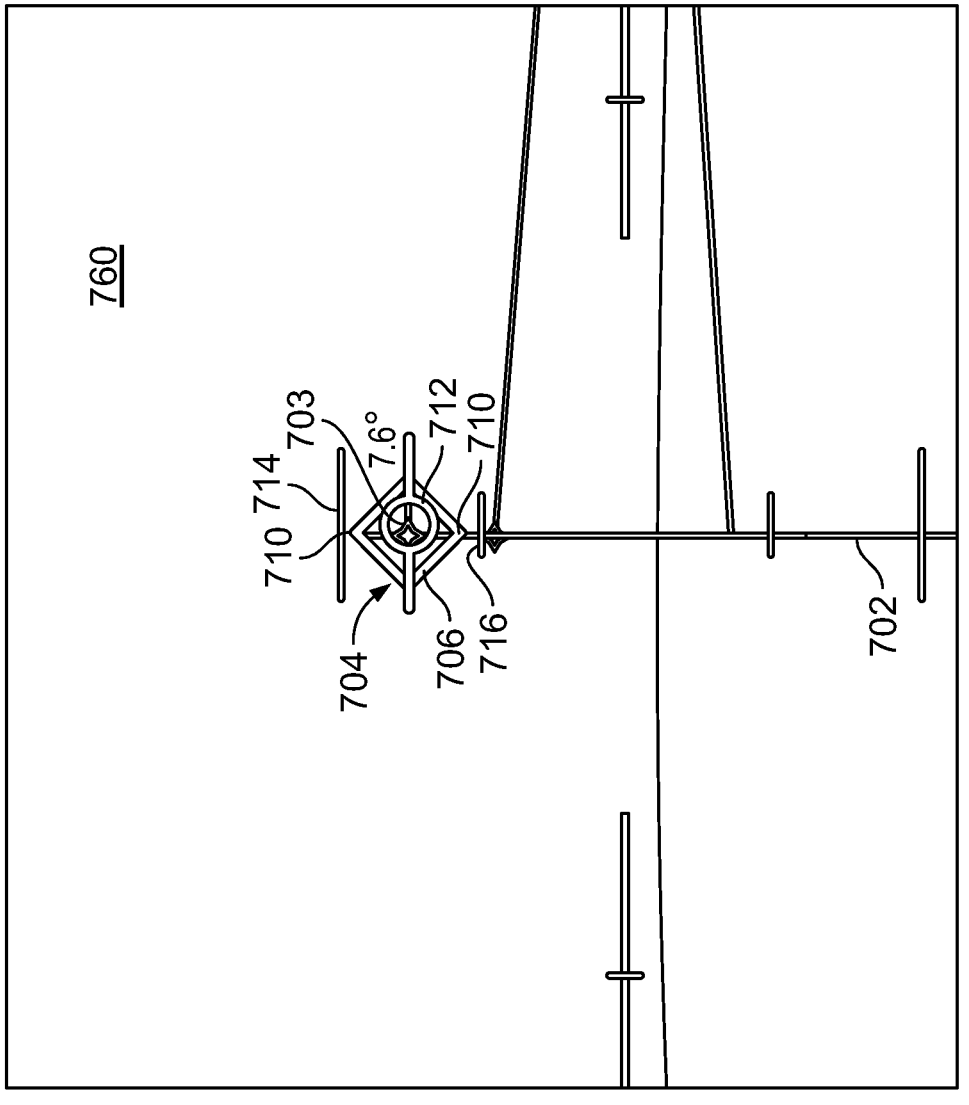

As illustrated in FIG. 7D, when the deviations to the defined path 702 are within a predetermined limit (e.g., 0-10 ft) of the defined path 702, the preferred intercept angle and the desired path angle align. The flight path vector symbol 712 moves inside of the preferred intercept angle symbol 706, and the plurality of tether symbols 708 appear to disappear. Thus, the 3-D tactical navigational symbol 704 can provide a pilot with a visual indication of the aerial vehicle's deviation both laterally and vertically from a defined path.

Figure 8:
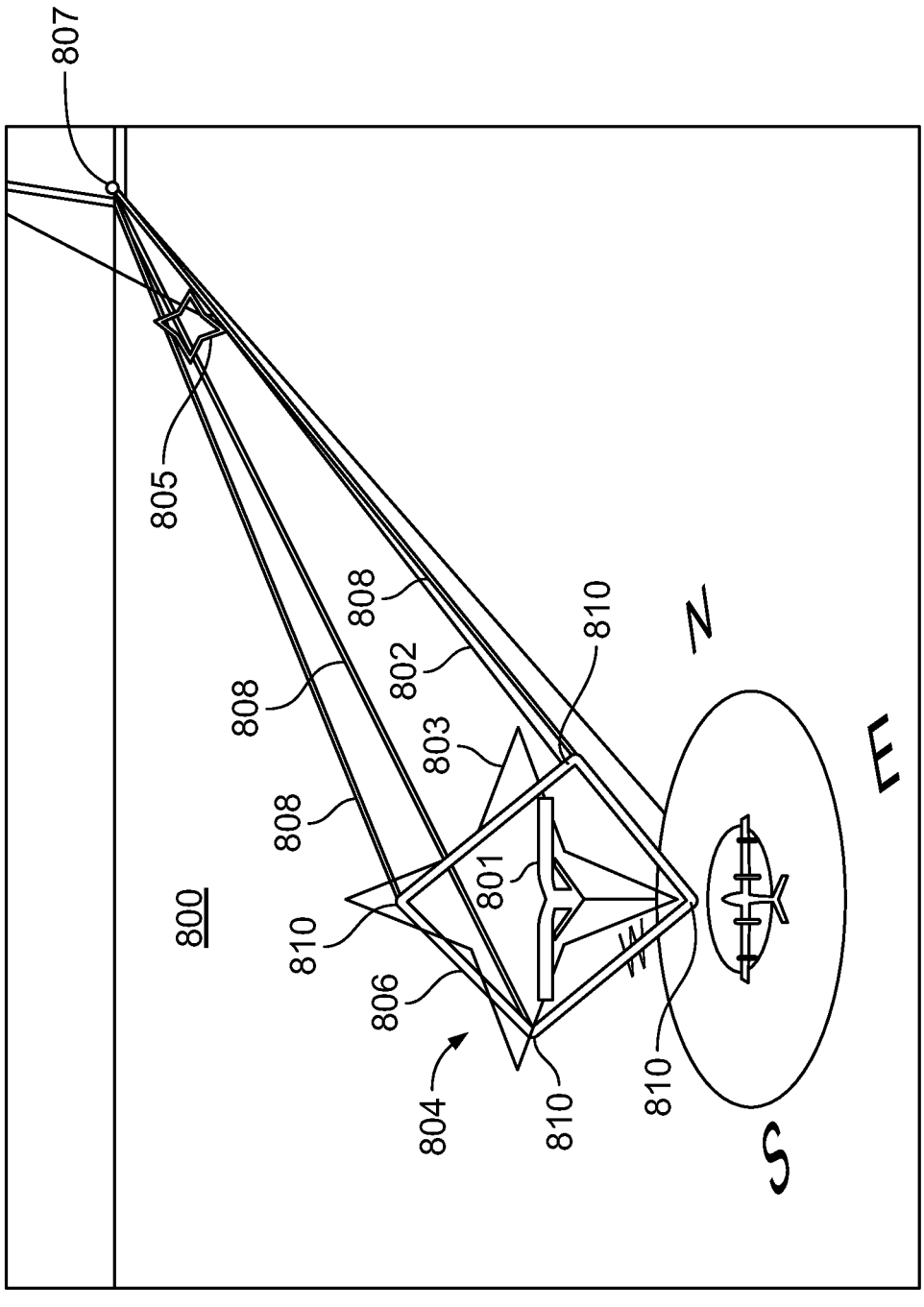
FIG. 8 depicts another example 3-D perspective projection synthetic view window that may be generated for display, in accordance with some embodiments.

FIG. 8 depicts an example three-dimensional (3-D) perspective projection synthetic view window 800 that depicts differences in three dimensions between a point on a defined path and the aerial vehicle at a latitude, longitude, altitude, and a given viewing angle and that may be generated by the 3-D perspective projection synthetic view controller 204 for display on a display device (such as display/UI 114 and/or display device 202). The example 3-D perspective projection synthetic view window 800 includes a graphical depiction of the aerial vehicle 801, a defined path 802 from an aerial vehicle's current position (waypoint 803) through a subsequent waypoint (waypoint 805), and a 3-D tactical navigational symbol 804. The 3-D tactical navigational symbol 804 is positioned with a preferred intercept angle symbol 806 above the graphical depiction of the defined path 802 at a predetermined measurement (e.g., 8 seconds) ahead of the aerial vehicle along the defined path 802. In this example, the aerial vehicle 801 is hovering with no forward motion and the preferred intercept angle symbol 806 is positioned at the current position.

The 3-D tactical navigational symbol 804 includes the preferred intercept angle symbol 806 at an end section and a plurality of tether symbols 808 (which appear as line segments) extending from vertices 810 of the preferred intercept angle symbol 806 to vertices of the next waypoint 805 and converging at an end point 807 at the vanishing point of the defined path 802. The preferred intercept angle symbol 806 is positioned at the predetermined measurement (e.g., 8 seconds) ahead of the aerial vehicle along the defined path 802. The end point 807 is positioned ahead of the preferred intercept angle symbol 806 along the direction of the defined path 802. In this example, the preferred intercept angle symbol 806 has a diamond shape. Other shapes may be used in other embodiments. In this example, the plurality of tether symbols 808 and the preferred intercept angle symbol 806 cooperate to form the 3-D tactical navigational symbol 804.

The example 3-D tactical navigational symbol 804 is positioned on the 3-D perspective projection synthetic view window 800 with the preferred intercept angle symbol 806 positioned based on the aerial vehicle's relative vertical and lateral position with respect to the defined path 802 and with the 3-D tactical navigational symbol 804 pointing toward the vanishing point 807 of the defined path 802. The positioning of the 3-D tactical navigational symbol 804 on the 3-D perspective projection synthetic view window 800 provides a pilot of the aerial vehicle with a view that can be used to direct the aerial vehicle back onto the defined path 802.

Figure 9:
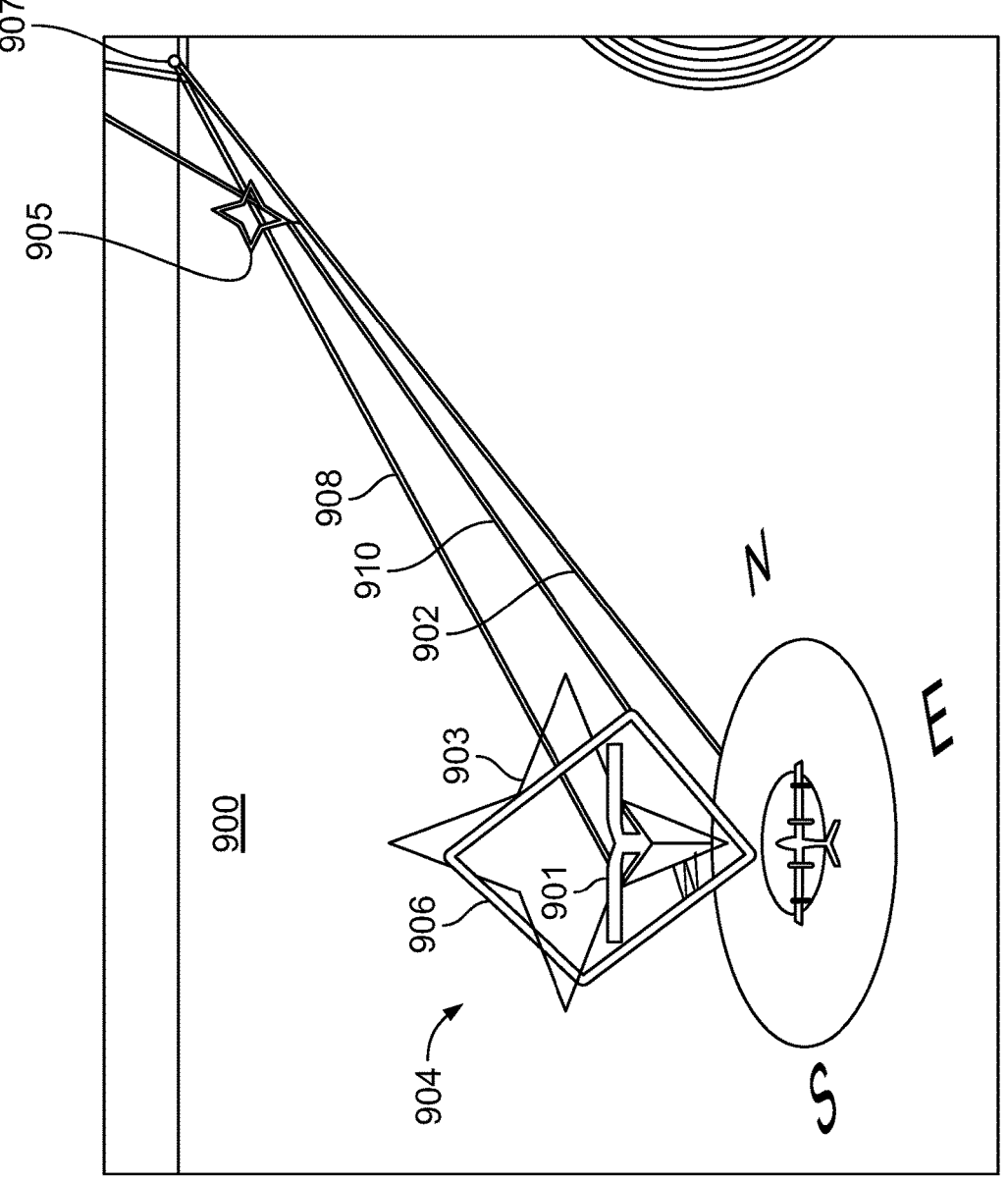
FIG. 9 depicts another example 3-D perspective projection synthetic view window that may be generated for display, in accordance with some embodiments.

FIG. 9 depicts an example three-dimensional (3-D) perspective projection synthetic view window 900 that depicts differences in three dimensions between a point on a defined path and the aerial vehicle at a latitude, longitude, altitude, and a given viewing angle and that may be generated by the 3-D perspective projection synthetic view controller 204 for display on a display device (such as display/UI 114 and/or display device 202). The example 3-D perspective projection synthetic view window 900 includes a graphical depiction of the aerial vehicle 901, a defined ground path 902 from an aerial vehicle's current position (waypoint 903) through a subsequent waypoint (waypoint 905), and a 3-D tactical navigational symbol 904. The 3-D tactical navigational symbol 904 is positioned with a preferred intercept angle symbol 906 above the graphical depiction of the defined ground path 902 at a predetermined measurement (e.g., 8 seconds) ahead of the aerial vehicle along the defined ground path 902. In this example, the aerial vehicle 901 is hovering with no forward motion and the preferred intercept angle symbol 906 is positioned at the current position.

The 3-D tactical navigational symbol 904 includes the preferred intercept angle symbol 906 at an end section and a first line segment 908 extending from a center of the preferred intercept angle symbol 906 to a vanishing point 907 of the defined ground path 902 and a second line segment 910 extending from a bottom vertex of the current position waypoint 903 to a bottom vertex of the subsequent waypoint 905. The preferred intercept angle symbol 906 is positioned at the predetermined measurement (e.g., 8 seconds) ahead of the aerial vehicle along the defined ground path 902. The vanishing point 907 is positioned ahead of the preferred intercept angle symbol 906 along the direction of the defined ground path 902. In this example, the preferred intercept angle symbol 906 has a diamond shape. Other shapes may be used in other embodiments. In this example, the first line segment 908, the second line segment 910, and the preferred intercept angle symbol 906 cooperate to form the 3-D tactical navigational symbol 904.

The example 3-D tactical navigational symbol 904 is positioned on the 3-D perspective projection synthetic view window 900 with the preferred intercept angle symbol 906 positioned based on the aerial vehicle's relative vertical and lateral position with respect to the defined ground path 902 and with the 3-D tactical navigational symbol 904 pointing toward the vanishing point 907 of the defined ground path 902. The positioning of the 3-D tactical navigational symbol 904 on the 3-D perspective projection synthetic view window 900 provides a pilot of the aerial vehicle with a view that can be used to direct the aerial vehicle back onto the defined ground path 902.

FIG. 10 is a process flow chart depicting an exemplary method 1000 for positioning a 3-D tactical navigational symbol in accordance with embodiments of the present disclosure. It should be understood that the steps described herein, and the sequence in which they are presented, are merely illustrative such that additional and/or fewer steps may be included without departing from the scope of the present disclosure. Also, FIG. 10 is described with reference to FIGS. 11A and 11B, wherein FIG. 11A depicts an example control system, in accordance with embodiments, and FIG. 11B depicts example mathematical relationships for positioning a 3-D tactical navigational symbol, in accordance with embodiments.

At block 1010, the method 1000 includes obtaining the lateral and vertical position of the aircraft relative to a preferred track angle. In various embodiments, obtaining the lateral and vertical position includes determining the desired track angle and desired flight path angle of that point. In various embodiments, the preferred track angle is an angle (measured in a clockwise direction) between a preferred track (or path) of an aerial vehicle and true North. In various embodiments the processor 111 may obtain the lateral and vertical position of the aircraft relative to the preferred track angle from the aircraft control system 115. In various embodiments the processor 111 may also obtain aircraft flight information such as one or more of a current position, a current trajectory, an energy level, a target destination, a phase of flight, and/or an operating status of the aircraft.

At block 1020, the method 1000 includes calculating a preferred intercept angle. In various embodiments, calculating a preferred intercept angle involves calculating an angle that will direct the aerial vehicle to the preferred track angle and/or preferred flight path angle. Having obtained the position of the aircraft relative to the preferred track angle, in various embodiments, the processor 111 may calculate the preferred intercept angle. The calculation of the preferred intercept angle may occur dynamically or at each instant the aircraft deviates from the preferred track angle. The computation of the preferred intercept angle may be based on classical control theory, as illustrated in FIG. 11A, to provide dynamic guidance to the pilot which results in an exponentially decreasing deviation from a defined path.

Figure 11A:
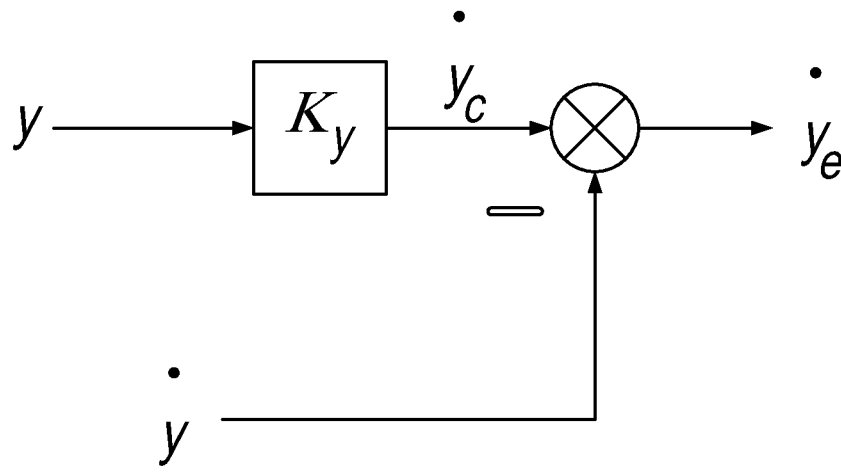
FIG. 11A depicts an example control system, in accordance with some embodiments.
Figure 11B:
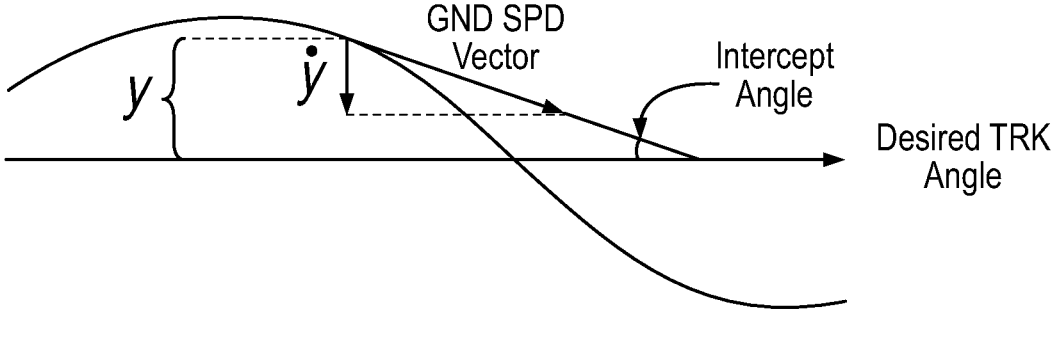
FIG. 11B depicts example mathematical relationships discussed herein for positioning a 3-D tactical navigational symbol, in accordance with embodiments.

In the FIG. 11A, y may be the position of the aircraft relative to the preferred track angle, $K_y$ may be the gain which is selected by the pilot for the phase of the flight and desired tracking performance, and y may be the change in deviation from the defined path with respect to time. In another embodiment, the calculation of the intercept angle may also include variables such as distance of aircraft 110 from the destination. If the pilot follows the suggest intercept angle and drives ye to a small value, the following relationship depicted in equation 1 below may be true:

$$yK_y = -\dot{y} \qquad (1)$$

Solving equation 1 for the position of the aircraft, y, may result in exponentially decreasing deviation as shown by the relationship depicted in equation 2 below:

$$y = e^{-K_y t} = e^{-t/\tau} \qquad (2)$$

As shown in equation 2, the gain, $K_y$, is the inverse of the time constant, $\tau$. Typically, a time constant for path guidance may be 8 seconds ($K_y=0.125$). A higher gain may result in a larger intercept angle, higher path accelerations and a quicker time constant.

FIG. 11B and equation 3 below illustrate the geometric relationship of the intercept angle, ground speed, and deviation rate ($\dot{y}$).

$$\sin\theta = \frac{\dot{y}}{GND_{spd}} \qquad (3)$$

Substituting equation 1 into equation 3 provides an equation to compute the intercept angle from the deviation (y) and aircraft ground speed as shown in equation 4 below:

$$\sin\theta = \frac{-yK_y}{GND_{spd}} \qquad (4)$$

At block 1030, the example method 1000 includes adding the preferred intercept angle (which was calculated at block 1020) to the preferred track angle. In various embodiments, the processor 111 may add the preferred intercept angle to the preferred track angle to position a 3-D tactical navigational symbol relative to the preferred track angle. For example, if the preferred track angle is 70 degrees and the calculated intercept angle is −10 degrees, the processor will add the two angles together and position the 3-D tactical navigational symbol at 60 degrees.

At block 1040, the example method 1000 includes rendering and displaying the 3-D tactical navigational symbol and, at block 1050, the example method 1000 includes rendering and displaying a graphical representation of connection to desired track angle and desired flight path angle. In various embodiments, the processor 111 may render the 3-D tactical navigational symbol and cause the 3-D tactical navigational symbol to be display on a GUI that includes a graphical depiction of a defined path. The preferred intercept angle symbol of the 3-D tactical navigational symbol may represent the preferred lateral and vertical intercept angle, which a pilot can use to guide the aircraft onto the defined path. Visual characteristics that may be assigned to the 3-D tactical navigational may include such variation as, for example, color, opacity, shape, and/or visual effects such as blinking or flashing.

Completion of method 1000 may result in providing an intuitive three dimensional view of an aircraft position relative to a defined path along with awareness of the current flight path relative to a preferred intercept angle.

In some aspects, the techniques described herein relate to a tactical navigational display system for an aerial vehicle, the system including: a display device onboard the aerial vehicle; and a controller for generating a three-dimensional (3-D) perspective projection synthetic view window for display on the display device, that depicts differences in three dimensions between a point on a defined path and the aerial vehicle at a latitude, longitude, altitude, and a given viewing angle, the 3-D perspective projection synthetic view window including: a graphical depiction of the defined path through a subsequent waypoint; and a 3-D tactical navigational symbol including a preferred intercept angle symbol at one end of the 3-D tactical navigational symbol and at least one line segment extending from the preferred intercept angle symbol and terminating at a second end of the 3-D tactical navigational symbol; wherein the controller is configured to: obtain position information of the aerial vehicle relative to the defined path of the aerial vehicle based on a current trajectory of the aerial vehicle; calculate a preferred intercept angle for the aerial vehicle to direct the aerial vehicle to a preferred track angle; render and cause the graphical depiction of the defined path to be displayed on the display device; and render and cause the 3-D tactical navigational symbol to be displayed on the display device and positioned relative to the graphical depiction of the defined path based on the preferred track angle and the intercept angle and wherein the 3-D tactical navigational symbol points at a position in front of the aerial vehicle at a desired path angle.

In some aspects, the techniques described herein relate to a tactical navigational display system, wherein the at least one line segment extending from the preferred intercept angle symbol includes a plurality of tether symbols extending from a plurality of vertices of the preferred intercept angle symbol and converging at the second end of the 3-D tactical navigational symbol at a common point.

In some aspects, the techniques described herein relate to a tactical navigational display system, wherein the preferred intercept angle symbol is positioned at a location ahead of the aerial vehicle on the current path.

In some aspects, the techniques described herein relate to a tactical navigational display system, wherein the plurality of tether symbols converge at a point between the preferred intercept angle symbol and the defined path, and wherein the 3-D tactical navigational symbol points to a position on the defined path that is a predetermined measurement ahead of the aerial vehicle.

In some aspects, the techniques described herein relate to a tactical navigational display system, wherein the controller is further configured to render and cause a forward path symbol to be displayed at the position on the defined path that is the predetermined measurement ahead of the aerial vehicle.

In some aspects, the techniques described herein relate to a tactical navigational display system, wherein the controller is further configured to cause the plurality of tether symbols of the 3-D tactical navigational symbol to decrease in size and the preferred intercept angle symbol to move closer to the forward path symbol as the aerial vehicle moves closer to the defined path.

In some aspects, the techniques described herein relate to a tactical navigational display system, wherein the controller is further configured to cause the preferred intercept angle symbol to overlay the plurality of tether symbols and overlap the forward path symbol when the aerial vehicle is on the defined path.

In some aspects, the techniques described herein relate to a tactical navigational display system, wherein the preferred intercept angle symbol is positioned at a location at a predetermined measurement ahead of the aerial vehicle above the graphical depiction of the defined path.

In some aspects, the techniques described herein relate to a tactical navigational display system, wherein the preferred intercept angle symbol is positioned at a location left of the graphical depiction of the defined path when the aerial vehicle is left of the defined path and wherein as a pilot steers the aerial vehicle in a right lateral direction, the plurality of tether symbols decrease in length.

In some aspects, the techniques described herein relate to a tactical navigational display system, wherein the preferred intercept angle symbol is positioned at a location right of the graphical depiction of the defined path when the aerial vehicle is right of the defined path and wherein as a pilot steers the aerial vehicle in a left lateral direction, the plurality of tether symbols decrease in length.

In some aspects, the techniques described herein relate to a tactical navigational display system, wherein the 3-D tactical navigational symbol is angled up when the aerial vehicle is below the defined path and wherein the 3-D tactical navigational symbol is angled down when the aerial vehicle is above the defined path.

In some aspects, the techniques described herein relate to a tactical navigational display system, wherein the controller is further configured to cause the preferred intercept angle symbol to overlay the plurality of tether symbols when the aerial vehicle is on the defined path.

In some aspects, the techniques described herein relate to a tactical navigational display system, wherein the plurality of tether symbols converge at a point between the preferred intercept angle symbol and a point in front of the preferred intercept angle symbol, and wherein the 3-D tactical navigational symbol points toward a vanishing point of the defined path.

In some aspects, the techniques described herein relate to a processor-implemented method of providing navigational assistance during flight in an aerial vehicle, the method including: obtaining position information of the aerial vehicle relative to a defined path of the aerial vehicle based on a current trajectory of the aerial vehicle; calculating an intercept angle for the aerial vehicle to direct the aerial vehicle to a preferred track angle; generating a three-dimensional (3-D) perspective projection synthetic view window, for display on a display device, that depicts differences in three dimensions between a point on a defined path and the aerial vehicle at a latitude, longitude, altitude, and a given viewing angle, the 3-D perspective projection synthetic view window including: a graphical depiction of the defined path through a subsequent waypoint; and a 3-D tactical navigational symbol including a preferred intercept angle symbol at one end of the 3-D tactical navigational symbol and at least one line segment extending from the preferred intercept angle symbol and terminating at a second end of the 3-D tactical navigational symbol, wherein the preferred intercept angle symbol is positioned relative to the graphical depiction of the defined path based on the preferred track angle and the intercept angle and wherein the 3-D tactical navigational symbol points at a position in front of the aerial vehicle at a desired path angle; and rendering and causing the 3-D perspective projection synthetic view window including the graphical depiction of the defined path and the 3-D tactical navigational symbol to be displayed on a display device for use in navigating the aerial vehicle.

In some aspects, the techniques described herein relate to a method, wherein the at least one line segment extending from the preferred intercept angle symbol includes a plurality of tether symbols extending from a plurality of vertices of the preferred intercept angle symbol and converging at the second end of the 3-D tactical navigational symbol at a common point.

In some aspects, the techniques described herein relate to a method, wherein the graphical depiction of the defined path includes a ground path, and the plurality of tether symbols that extend to vertices of a subsequent waypoint symbol.

In some aspects, the techniques described herein relate to a method, wherein the preferred intercept angle symbol is positioned at a location at a predetermined measurement ahead of the aerial vehicle above the graphical depiction of the defined path.

In some aspects, the techniques described herein relate to a method, wherein: the 3-D perspective projection synthetic view window further includes a flight path vector symbol; as the aerial vehicle is steered in a right lateral direction when the flight path vector symbol is left of the preferred intercept angle symbol, the flight path vector symbol moves closer to the preferred intercept angle symbol; and as the aerial vehicle is steered in a left lateral direction when the flight path vector symbol is right of the preferred intercept angle symbol, the flight path vector symbol moves closer to the preferred intercept angle symbol.

In some aspects, the techniques described herein relate to a method, further including causing the flight path vector symbol to move within the preferred intercept angle symbol when the aerial vehicle is within a few feet of the defined path.

In some aspects, the techniques described herein relate to a non-transitory computer readable medium having stored thereon instructions that when executed by a processor cause the processor to perform a method including: obtaining position information of an aerial vehicle relative to a defined path of the aerial vehicle based on a current trajectory of the aerial vehicle; calculating an intercept angle for the aerial vehicle to direct the aerial vehicle to a preferred track angle; generating a three-dimensional (3-D) perspective projection synthetic view window, for display on a display device, that depicts differences in three dimensions between a point on a defined path and the aerial vehicle at a latitude, longitude, altitude, and a given viewing angle, the 3-D perspective projection synthetic view window including: a graphical depiction of the defined path through a subsequent waypoint; and a 3-D tactical navigational symbol including a preferred intercept angle symbol at one end of the 3-D tactical navigational symbol and at least one line segment extending from the preferred intercept angle symbol and terminating at a second end of the 3-D tactical navigational symbol, wherein the preferred intercept angle symbol is positioned relative to the graphical depiction of the defined path based on the preferred track angle and the intercept angle and wherein the 3-D tactical navigational symbol points at a position in front of the aerial vehicle at a desired path angle; and rendering and causing the 3-D perspective projection synthetic view window including the graphical depiction of the defined path and the 3-D tactical navigational symbol to be displayed on a display device for use in navigating the aerial vehicle.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A tactical navigational display system for an aerial vehicle, the system comprising:

a display device onboard the aerial vehicle; and a controller configured to generate, for display on the display device, a three-dimensional (3-D) perspective projection synthetic view window that provides a pilot of the aerial vehicle with a view for use in directing the aerial vehicle onto a defined path and that depicts differences in three dimensions between a point on the defined path and the aerial vehicle at a latitude, longitude, altitude, and a given viewing angle, the 3-D perspective projection synthetic view window comprising:

a graphical depiction of the defined path through a subsequent waypoint; and a 3-D tactical navigational symbol comprising a preferred intercept angle symbol at one end of the 3-D tactical navigational symbol and at least one line segment extending from the preferred intercept angle symbol and terminating at a second end of the 3-D tactical navigational symbol;

wherein to manipulate the view provided for use in directing the aerial vehicle onto a defined path the controller is configured to:

obtain position information of the aerial vehicle relative to the defined path of the aerial vehicle based on a current trajectory of the aerial vehicle;

calculate a preferred intercept angle for the aerial vehicle to direct the aerial vehicle to a preferred track angle measured between the defined path and true North;

render and cause the graphical depiction of the defined path to be displayed on the display device; and render and cause the 3-D tactical navigational symbol to be displayed on the display device and positioned relative to the graphical depiction of the defined path based on the preferred track angle and the preferred intercept angle and wherein the 3-D tactical navigational symbol points at a position in front of the aerial vehicle at a desired path angle.

2. The tactical navigational display system of claim 1, wherein the at least one line segment extending from the preferred intercept angle symbol comprises a plurality of tether symbols extending from a plurality of vertices of the preferred intercept angle symbol and converging at the second end of the 3-D tactical navigational symbol at a common point.

3. The tactical navigational display system of claim 2, wherein the preferred intercept angle symbol is positioned at a location ahead of the aerial vehicle on the current path.

4. The tactical navigational display system of claim 3, wherein the plurality of tether symbols converge at a point between the preferred intercept angle symbol and the defined path, and wherein the 3-D tactical navigational symbol points to a position on the defined path that is a predetermined measurement ahead of the aerial vehicle.

5. The tactical navigational display system of claim 4, wherein the controller is further configured to render and cause a forward path symbol to be displayed at the position on the defined path that is the predetermined measurement ahead of the aerial vehicle.

6. The tactical navigational display system of claim 5, wherein the controller is further configured to cause the plurality of tether symbols of the 3-D tactical navigational symbol to decrease in size and the preferred intercept angle symbol to move closer to the forward path symbol as the aerial vehicle moves closer to the defined path.

7. The tactical navigational display system of claim 6, wherein the controller is further configured to cause the preferred intercept angle symbol to overlay the plurality of tether symbols and overlap the forward path symbol when the aerial vehicle is on the defined path.

8. The tactical navigational display system of claim 2, wherein the preferred intercept angle symbol is positioned at a location at a predetermined measurement ahead of the aerial vehicle above the graphical depiction of the defined path.

9. The tactical navigational display system of claim 8, wherein the preferred intercept angle symbol is positioned at a location left of the graphical depiction of the defined path when the aerial vehicle is left of the defined path and wherein as a pilot steers the aerial vehicle in a right lateral direction, the plurality of tether symbols decrease in length.

10. The tactical navigational display system of claim 8, wherein the preferred intercept angle symbol is positioned at a location right of the graphical depiction of the defined path when the aerial vehicle is right of the defined path and wherein as a pilot steers the aerial vehicle in a left lateral direction, the plurality of tether symbols decrease in length.

11. The tactical navigational display system of claim 8, wherein the 3-D tactical navigational symbol is angled up when the aerial vehicle is below the defined path and wherein the 3-D tactical navigational symbol is angled down when the aerial vehicle is above the defined path.

12. The tactical navigational display system of claim 8, wherein the controller is further configured to cause the preferred intercept angle symbol to overlay the plurality of tether symbols when the aerial vehicle is on the defined path.

13. The tactical navigational display system of claim 8, wherein the plurality of tether symbols converge at a point between the preferred intercept angle symbol and a point in front of the preferred intercept angle symbol, and wherein the 3-D tactical navigational symbol points toward a vanishing point of the defined path.

14. A processor-implemented method of providing navigational assistance during flight in an aerial vehicle, the method comprising:

obtaining position information of the aerial vehicle relative to a defined path of the aerial vehicle based on a current trajectory of the aerial vehicle;

calculating an intercept angle for the aerial vehicle to direct the aerial vehicle to a preferred track angle measured between the defined path and true North;

generating, for display on a display device, a three-dimensional (3-D) perspective projection synthetic view window that provides a pilot of the aerial vehicle with a view for use in directing the aerial vehicle onto a defined path and that depicts differences in three dimensions between a point on the defined path and the aerial vehicle at a latitude, longitude, altitude, and a given viewing angle, the 3-D perspective projection synthetic view window comprising:

a graphical depiction of the defined path through a subsequent waypoint; and a 3-D tactical navigational symbol comprising a preferred intercept angle symbol at one end of the 3-D tactical navigational symbol and at least one line segment extending from the preferred intercept angle symbol and terminating at a second end of the 3-D tactical navigational symbol, wherein the preferred intercept angle symbol is positioned relative to the graphical depiction of the defined path based on the preferred track angle and the intercept angle and wherein the 3-D tactical navigational symbol points at a position in front of the aerial vehicle at a desired path angle; and rendering and causing the 3-D perspective projection synthetic view window including the graphical depiction of the defined path and the 3-D tactical navigational symbol to be displayed on the display device for use in navigating the aerial vehicle.

15. The method of claim 14, wherein the at least one line segment extending from the preferred intercept angle symbol comprises a plurality of tether symbols extending from a plurality of vertices of the preferred intercept angle symbol and converging at the second end of the 3-D tactical navigational symbol at a common point.

16. The method of claim 15, wherein the graphical depiction of the defined path comprises a ground path, and the plurality of tether symbols that extend to vertices of a subsequent waypoint symbol.

17. The method of claim 16, wherein the preferred intercept angle symbol is positioned at a location at a predetermined measurement ahead of the aerial vehicle above the graphical depiction of the defined path.

18. The method of claim 17, wherein:

the 3-D perspective projection synthetic view window further comprises a flight path vector symbol;

as the aerial vehicle is steered in a right lateral direction when the flight path vector symbol is left of the preferred intercept angle symbol, the flight path vector symbol moves closer to the preferred intercept angle symbol; and as the aerial vehicle is steered in a left lateral direction when the flight path vector symbol is right of the preferred intercept angle symbol, the flight path vector symbol moves closer to the preferred intercept angle symbol.

19. The method of claim 18, further comprising causing the flight path vector symbol to move within the preferred intercept angle symbol when the aerial vehicle is within a few feet of the defined path.

20. A non-transitory computer readable medium having stored thereon instructions that when executed by a processor cause the processor to perform a method comprising:

obtaining position information of an aerial vehicle relative to a defined path of the aerial vehicle based on a current trajectory of the aerial vehicle;

calculating an intercept angle for the aerial vehicle to direct the aerial vehicle to a preferred track angle measured between the defined path and true North;

generating, for display on a display device, a three-dimensional (3-D) perspective projection synthetic view window that provides a pilot of the aerial vehicle with a view for use in directing the aerial vehicle onto a defined path and that depicts differences in three dimensions between a point on the defined path and the aerial vehicle at a latitude, longitude, altitude, and a given viewing angle, the 3-D perspective projection synthetic view window comprising:

a graphical depiction of the defined path through a subsequent waypoint; and a 3-D tactical navigational symbol comprising a preferred intercept angle symbol at one end of the 3-D tactical navigational symbol and at least one line segment extending from the preferred intercept angle symbol and terminating at a second end of the 3-D tactical navigational symbol, wherein the preferred intercept angle symbol is positioned relative to the graphical depiction of the defined path based on the preferred track angle and the intercept angle and wherein the 3-D tactical navigational symbol points at a position in front of the aerial vehicle at a desired path angle; and rendering and causing the 3-D perspective projection synthetic view window including the graphical depiction of the defined path and the 3-D tactical navigational symbol to be displayed on the display device for use in navigating the aerial vehicle.

* * * * *